(12) United States Patent
Jones et al.

(10) Patent No.: US 6,493,649 B1
(45) Date of Patent: Dec. 10, 2002

(54) DETECTION SYSTEM FOR DETERMINING POSITIONAL AND OTHER INFORMATION ABOUT OBJECTS

(75) Inventors: Alan Henry Jones, Cambridge (GB); Andrew Martin Robert Ward, Cambridge (GB)

(73) Assignee: AT&T Laboratories - Cambridge Limited, Cambridge (GB)

( * ) Notice: Subject to any disclaimer, the term of this patent is extended or adjusted under 35 U.S.C. 154(b) by 0 days.

(21) Appl. No.: 09/319,047

(22) PCT Filed: Dec. 4, 1997

(86) PCT No.: PCT/GB97/03359

§ 371 (c)(1),
(2), (4) Date: Jul. 12, 1999

(87) PCT Pub. No.: WO98/28634

PCT Pub. Date: Jul. 2, 1998

(30) Foreign Application Priority Data

Dec. 4, 1996 (GB) .............................. 9625208

(51) Int. Cl.[7] .................... G06F 15/00; G01S 15/00
(52) U.S. Cl. ................. 702/150; 702/153; 367/99
(58) Field of Search ..................... 702/150, 152, 702/153, 155, 159, 94–95; 340/10.4, 825.08, 825.57, 825.69, 505, 539; 342/450, 458; 367/93, 99

(56) References Cited

U.S. PATENT DOCUMENTS

| | | | | |
|---|---|---|---|---|
| 3,777,305 A | * | 12/1973 | Stoutmeyer | 367/127 |
| 4,853,863 A | * | 8/1989 | Cohen et al. | 702/153 |
| 4,862,152 A | * | 8/1989 | Milner | 367/117 |
| 5,359,575 A | | 10/1994 | Williams | 367/127 |
| 5,504,477 A | * | 4/1996 | Whitnight et al. | 340/10.4 |
| 5,973,996 A | * | 10/1999 | Zhevelev et al. | 367/99 |

* cited by examiner

Primary Examiner—Bryan Bui
(74) Attorney, Agent, or Firm—Lee, Mann, Smith, McWilliams, Sweeney & Ohlson

(57) ABSTRACT

A system for determining the position of each of a plurality of objects in a specified environment by determining the transit times of slowly propagating measurement energy transmitted from a measurement energy transmitter on each object to a plurality of fixed measurement energy receivers in the specified environment, the transmission of the measurement energy being triggered by a burst of high speed propagating trigger energy into the specified environment from a trigger energy transmitter, the measurement energy transmitter on each object being triggered by an object-mounted trigger energy receiver, each burst of trigger energy being encoded so as to trigger one only of the measurement energy transmitters, wherein a coordinating control system determines the order in which the measurement energy transmitters are triggered, in response to updatable information relating to service demands of the trigger energy transmitter and/or objects.

19 Claims, 34 Drawing Sheets

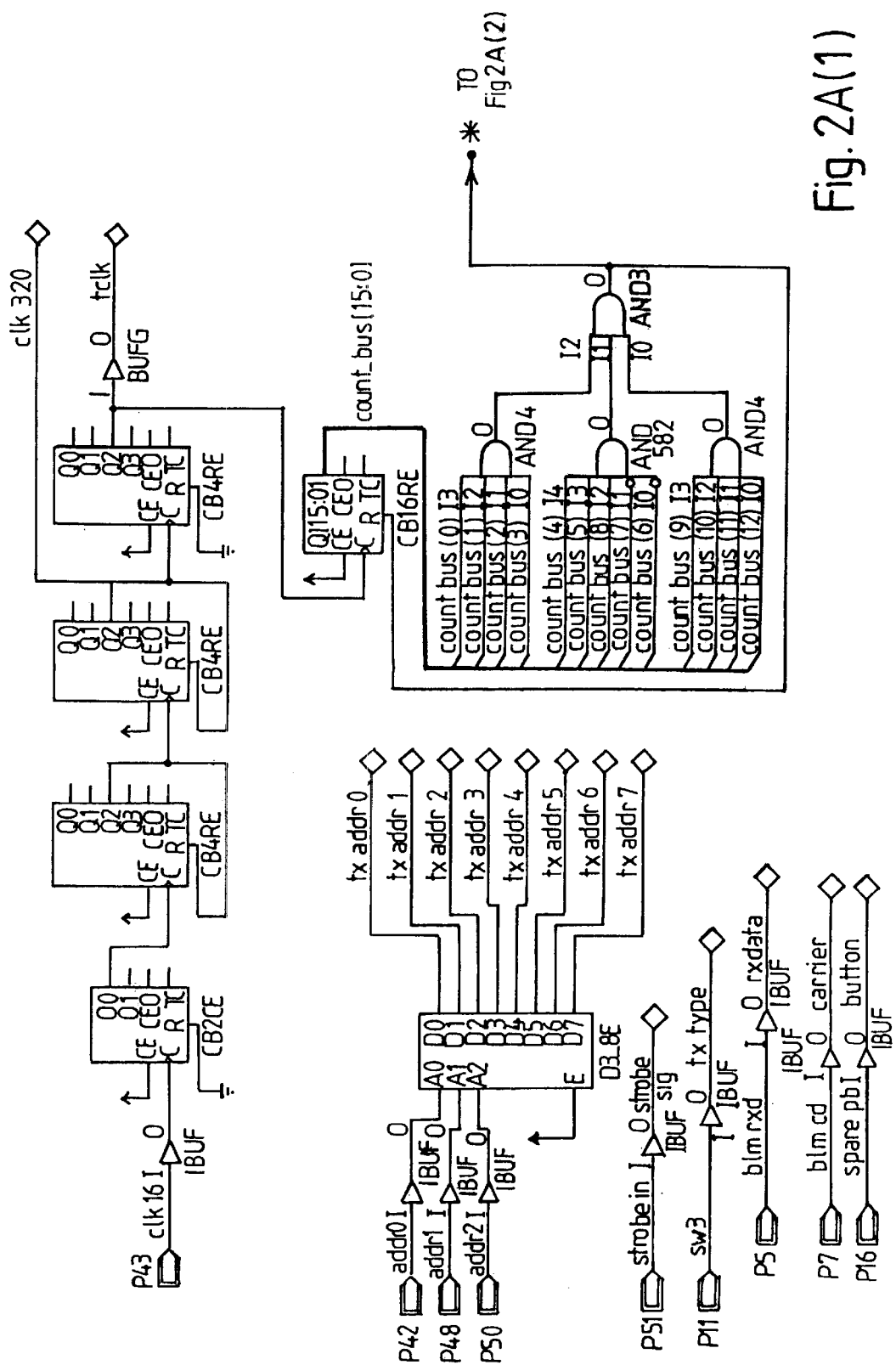
Fig. 2A(1)

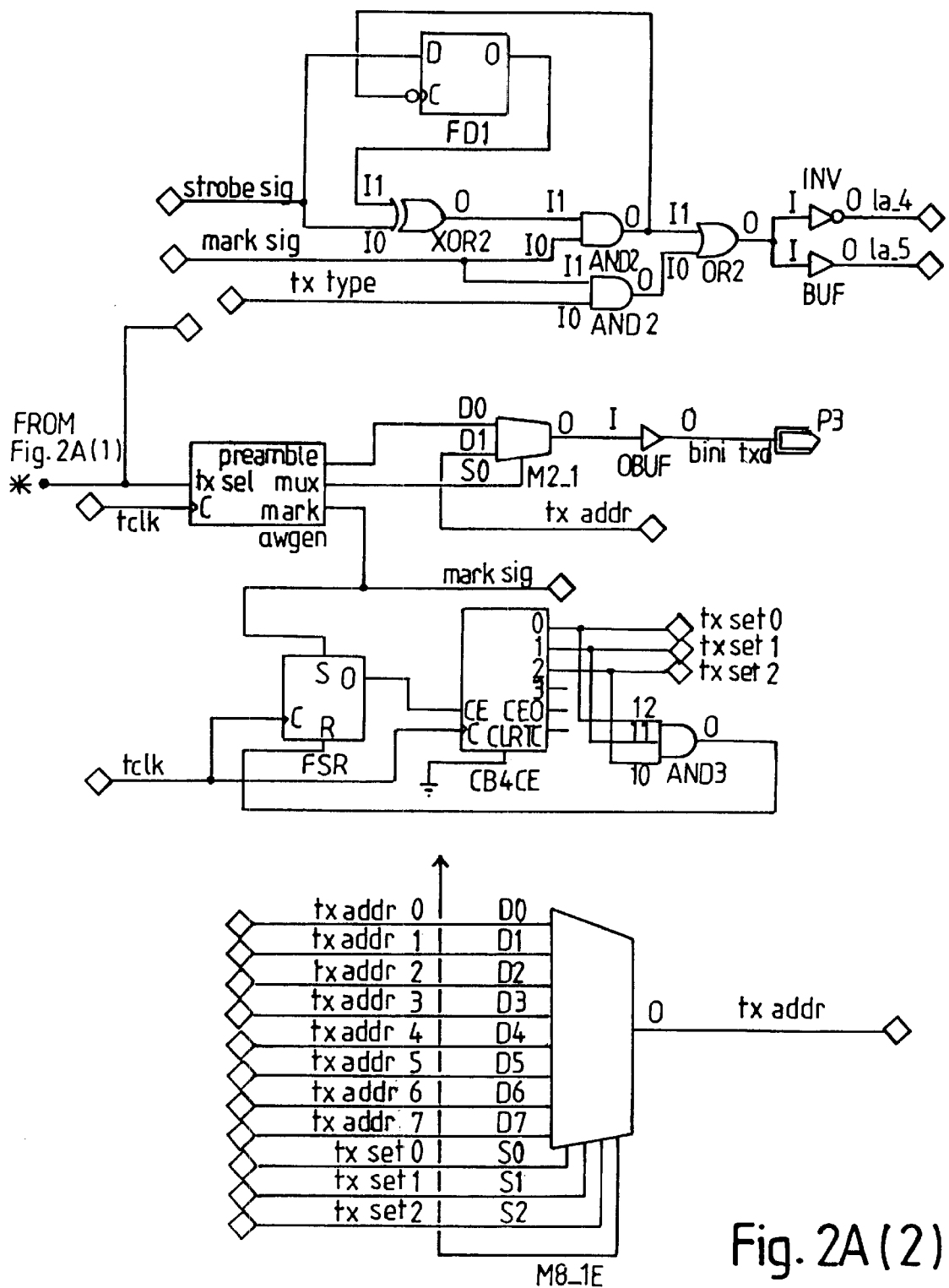
Fig. 2A(2)

① Central Controller triggers all receivers on network

② Receiver monitors 40kHz channel for 20mS

③ Central Controller polls receiver across network

④ Receiver returns a value either:
    a) time after trigger at which incoming signal peaked for the first time
or
    b) zero indicating that no useful signal was detected ① Central Controller triggers all receivers on network ② Receiver Logic passes trigger signal to both channels ③ Both receiver channels monitor incoming signal for 20mS ④ After 20mS window closes, each channel passes a data value ( a & b, above) to the comparison logic:
either
1) time after trigger at which incoming signal peaked for the first time
or
2) zero, indicating that no useful signal was detected.

⑤ Central controller polls receiver across network.

⑥ Receiver returns a data value, c, where:
c = a IF b = 0
c = 0 IF b ≠ 0

Fig. 18 OVERVIEW

ZONE MANAGER

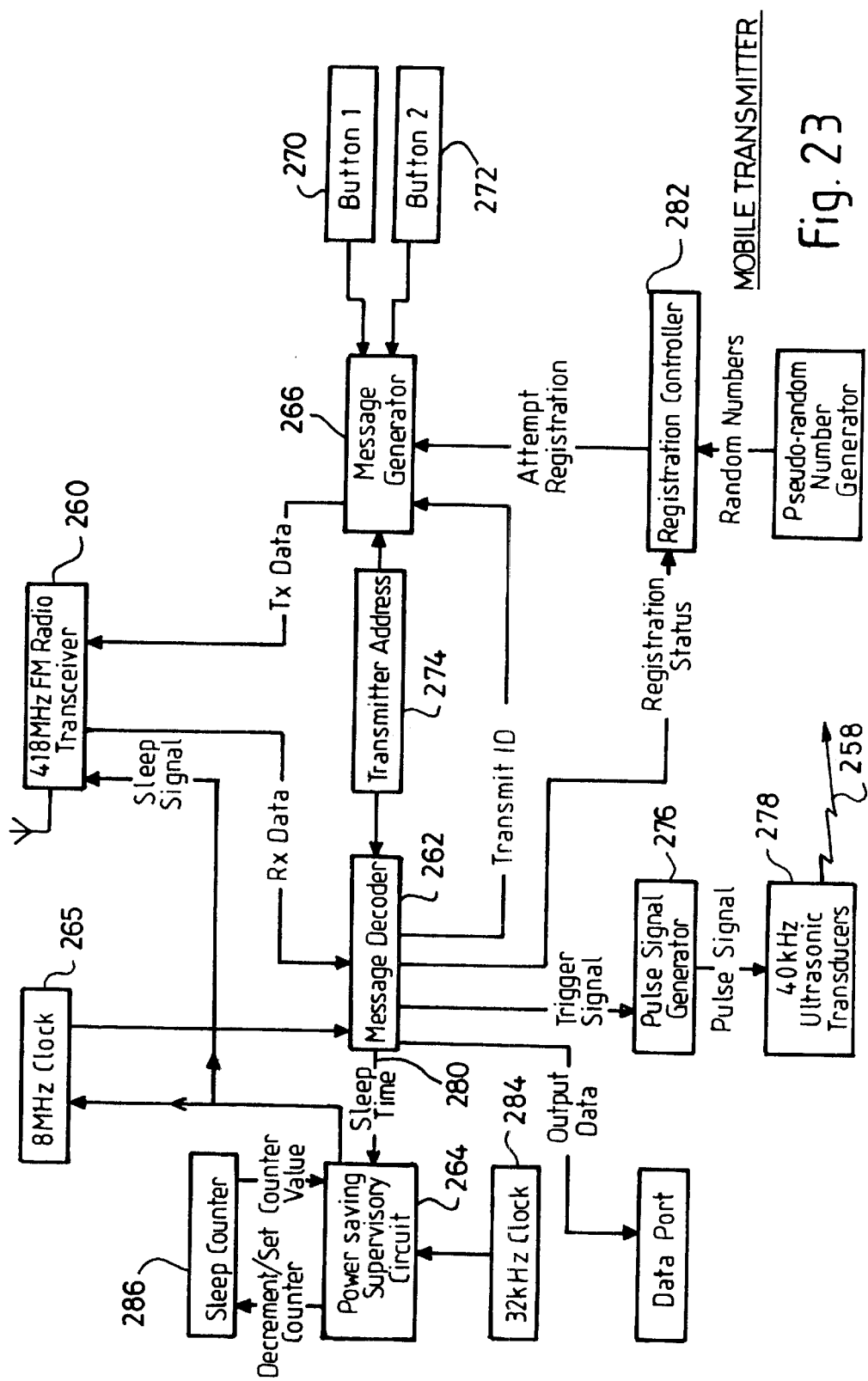
Fig. 23 MOBILE TRANSMITTER $$t = \sum_{i=1, a_i \neq 0}^{m} \frac{1}{l_i} \qquad (1) \text{ Fig. 24}$$

$$e'_i = \begin{cases} l_i & \text{if } a_i \neq 0 \\ \frac{1}{(1-t)} & \text{if } a_i = 0 \end{cases} \qquad (2) \text{ Fig. 25}$$

$$e'_i = \begin{cases} l_i \times t & \text{if } a_i \neq 0 \\ 0 & \text{if } a_i = 0 \end{cases} \qquad (3) \text{ Fig. 26}$$

$$s'_x = s_x - \frac{(s_x - s_r)}{n} \qquad (4) \text{ Fig. 27}$$

$$\hat{u} = \frac{\sum_{i=1}^{n} u_i}{n} \qquad (5) \text{ Fig. 28}$$

$$\hat{v} = \frac{\sum_{i=1}^{n} v_i}{n} \qquad (6) \text{ Fig. 29}$$

$$\hat{w} = \frac{\sum_{i=1}^{n} w_i}{n} \qquad (7) \text{ Fig. 30}$$

$$a = \hat{u} - x \qquad (8) \text{ Fig. 31}$$

$$b = \hat{v} - y \qquad (9) \text{ Fig. 32}$$

$$c = \hat{w} - z \qquad (10) \text{ Fig. 33}$$

$$\sin(\theta) = \frac{\left|\begin{pmatrix} m \\ n \\ 0 \end{pmatrix} \times \begin{pmatrix} a \\ b \\ 0 \end{pmatrix}\right|}{\left|\begin{pmatrix} m \\ n \\ 0 \end{pmatrix}\right|\left|\begin{pmatrix} a \\ b \\ 0 \end{pmatrix}\right|} \qquad (11) \quad \text{Fig 34}$$

$$\cos(\theta) = \frac{\begin{pmatrix} m \\ n \\ 0 \end{pmatrix} \cdot \begin{pmatrix} a \\ b \\ 0 \end{pmatrix}}{\left|\begin{pmatrix} m \\ n \\ 0 \end{pmatrix}\right|\left|\begin{pmatrix} a \\ b \\ 0 \end{pmatrix}\right|} \qquad (12) \quad \text{Fig.35}$$

$$st = \begin{cases} \lfloor -s \times e \rfloor & \text{if } s < 0 \\ 0 & \text{otherwise} \end{cases} \qquad (13) \quad \text{Fig.36}$$

TABLE A

| Description | Size (bits) |
|---|---|
| *wake* bit | 1 |
| Padding (zeroes) | 8 |
| CRC 1 | 8 |
| *drop* bit #1 | 1 |
| *drop* bit #2 | 1 |
| Transmitter Address #1 | 16 |
| Transmitter Address #2 | 16 |
| CRC 2 | 8 |
| *transmit* bit #1 | 1 |
| *transmit* bit #2 | 1 |
| Padding (zeroes) | 13 |
| Sleep Time #1 | 24 |
| Sleep Time #2 | 24 |
| CRC 3 | 8 |
| Padding (zeroes) | 5 |
| Output Data Value #1 | 8 |
| Output Data Value #2 | 8 |
| Registration Acknowledgement #1 | 16 |
| Registration Acknowledgement #2 | 16 |
| CRC 4 | 8 |

Fig. 37

TABLE B

| Description | Size (bits) |
|---|---|
| Transmitter Address | 16 |
| CRC | 8 |
| Button 1 Status | 1 |
| Button 2 Status | 1 |

DETECTION SYSTEM FOR DETERMINING POSITIONAL AND OTHER INFORMATION ABOUT OBJECTS

FIELD OF THE INVENTION

This invention relates to a detection system for determining information concerning the location of objects, and which can be extended go determine movement and orientation and even physical parameters such as shape of objects in a specified environment. The invention can be applied to people and animals as well as inanimate objects such as furniture, machines, vehicles, equipment and the like, and in this connection object is intended to include any movable entity.

BACKGROUND TO THE INVENTION

Location systems are known which allow the presence or absence of an object in a specified environment (such as a room) to be confirmed or denied, and relative to one or more reference points to identify where in the environment the object is located.

EP 0485879 describes a system for locating vehicles in automatic guidance transport systems. Ultrasound is employed as a distance measuring medium whilst an infrared link allows communication between vehicles.

WO95/14241 describes a tracking system which enables a spotlight to follow a person on a stage carrying a transponder. Again infra-red signals are used to instigate ultrasonic transmissions to determine the position of the transponder and therefore the person. The spotlight is moved accordingly.

EP 0591899 describes another spotlight controlling system for tracking a moving target (actor on a stage) carrying a transponder. Here radio transmissions establish the communication link and ultrasound transmissions are employed to determine distance and position.

These systems do not measure characteristics other than position and are limited with regard to the number of objects which can be tracked due to the length of time needed for each ultrasound transmission to die away, which is inherent in any such system, and it is an object of the present invention to provide a detection system capable of track-in more objects, which can be modified to allow orientation, rotational movement and linear movement to be determined and tracked and will further allow for control of operable devices on or associated with the object.

THE INVENTION

A system embodying the invention enables the position of each of a plurality of labelled objects in a specified environment to be determined by determining the transit time of slowly propagating energy transmitted from a transmitter on each labelled object, to a plurality of receivers positioned at fixed points in or around the specified environment, and computing therefrom the actual distance of the transmitter from the receivers, wherein the transmission of the slowly propagating energy is initiated by a burst of high speed propagating energy from a master transmitter located so as to cause transmitted bursts of such high speed energy to enter the said environment, and the transmitter is associated with a receiver adapted to respond to an appropriately encoded burst of such high speed energy, to thereby initiate a burst of slowly propagating energy therefrom, (each said transmitter/receiver combination being referred to as a transponder) and in order to allow the system to adapt to different numbers of transponders and differing demands for service (eg frequency of position determination per transponder or object), a coordinating control system is provided for determining the order in which the object mounted transmitter/receiver combinations are to be addressed and triggered by the transmissions from the master transmitter, in response to updatable information relating to the objects and related service demands.

Preferably each of the said plurality of receivers is adapted also to be responsive to said burst of high speed energy, so as to identify the beginning of a window of time within which a slow speed energy burst may arise and be received thereby. The burst may be the same burst as is sent to trigger one of the transmitter/receiver units transponders to transmit a slowly propagating wave, for time measurement.

Alternatively the said plurality of receivers may be connected by a network of cables and the reset signals and the polling of the time values may be achieved via the network.

Preferably the receivers include a latch to retain information about the time at which the beginning of a burst of slow speed energy is received after the beginning of each said time window.

Preferably the receivers are scanned (ie polled) so as to recover the time information and reset the latches.

Preferably computing means is provided to associate the time information with the receiver from which the times have been obtained, and generate a transmit time for each receiver.

Preferably the computing means is programmed to convert the transit time into distance values and using position data relating to the receivers stored in a memory, to compute therefrom the position of the object mounted transponder from each of the receivers, and therefore, by geometry its position relative to one or more fixed points defining the specified environment.

By encoding the high speed energy transmission, so a plurality of different slow speed signal transmitters all located in the same specified environment, can be triggered in turn, so that during a sequence of time windows, position data relating to each of the slow speed signal transmitters in the environment can be obtained, the data in each window relating specifically to one only of the object mounted transponders.

Typically the slow speed signals are acoustic or ultrasonic signals and the high speed signals are electric currents or voltage or visible or invisible electromagnetic radiation such as IR, UV or radio signals.

Encoding of the high speed signals may be by way of frequency or amplitude or phase modulation or pulse coding or any combination thereof.

Preferably digital encoding techniques are employed, if only to ensure adequate signal to noise ratios can be achieved.

Background Theory to Position Determining Systems

Such systems are based on the principle or location by multilateration. For each object that is to be located, the straight-line distances are measured from a point on that object to a number of other points in the environment whose positions (in some frame of reference) are already known. Given enough distances, and a suitable geometry of the endpoints between which they are measured, it is possible to derive a position for the object.

To determine the distances between objects and points in the environment, transmitters and receivers are placed on them and measurements are made of the times of signal pulses being generated and received. The system can be used to measure round trip delays, or alternatively can give the difference in the one-way delays for signal pulses sent simultaneously (or with known time offsets). If the one-way delay in two media are $dt_1$ and $dt_2$, then $$D=dt_1-dt_2,$$

and if the (predictable) velocities of propagation in the two media are $v_1$ and $v_2$, and the distance between transmitter and receiver is R, then $$R=D/(1/v_1-1/v_2).$$

It may be seen that if $v_2$ is much greater than $v_1$, then the range calculation can be approximated by $$R=Dv_1.$$

Thus, if, for example, radio and ultrasonic signals are transmitted simultaneously through space then the equation $R=Dv_1$ will give sufficiently accurate results for the limited range of distance likely to occur in an indoor environment, such as a typical house, room, office or even small factory unit or warehouse.

It is not necessary to transmit both fast and slow speed signals simultaneously. A radio pulse for example, can be treated as if its travel time is zero (i.e. independent of range), and it can thus simply be used as a trigger signal. However the flight times of the slow signal pulses (e.g. ultrasonic pulses) can be accurately measured by synchronising the transmitter and receiver units, as by a timing pulse generated by a suitable controller.

Reflections from other objects in the transmitter's environment may cause multiple signals to arrive at a receiver. Any direct-path signal from the transmitter to the receiver should arrive before these reflections, so that in general all pulses arriving at a receiver after the first one should be ignored. For this reason, it is important that the width of the pulse sent by the transmitter is as short as possible, so that the direct-path and reflected signals may be identified optimally.

Problems in Such Systems

It should be noted that diffraction of the pulse signal may also occur, and this will produce similar effects to the unwanted reflections.

Once a set of distances from the transponder transmitter to the receivers has been found, the system is programmed to attempt to derive a position of the transponder.

It is possible that some receivers will have detected no signal from the transponder transmitter, due to obstructions, directionality of the transmitting element, etc. These receivers must be excluded from further consideration.

It is also possible that the first pulse detected by a receiver is a reflected or diffracted signal. (This may occur, for example, if the direct signal path is obstructed). In this case, the computed distance will be greater than the true distance, and errors would be introduced into the position for the transmitter that is reported by the system if that incorrect distance is used in the position calculation. In general the computed distances would not identify a unique point (or more generally small volume). If this occurs the erroneous computed value has to be identified and eliminated.

Reflected and diffracted signals that arrive at receivers can sometimes be distinguished from direct path signals by inspection of the received pulse shape, and thereby inaccurate measurement eliminated.

If this is not possible, other ways must be found of comparing the distances measured by receivers for example by comparing measurements made by pairs of receivers in order to identify and eliminate erroneous signals.

One way of doing this is to compare the distances reported by all pairs of receivers that have detected a slow speed signal. It can be shown geometrically that the difference of the measured distances from two receivers to a transponder transmitter cannot be greater than the straight-line distance between the two receivers, if the measured distances are accurate. Thus, if a pair of receivers is found for which the measured distances to the transponder transmitter do not satisfy this criterion, the receiver that has reported the longer distance can be excluded from further consideration, since reflections and refractions in general will tend to produce longer distance values than the true straight-line distance.

Distance Computation and Position Fixing

Having performed this algorithm, the system may be adapted to attempt to fit a non-linear regression model to the remaining distances, by performing an iterative regression computation on the data.

If this fails to converge, the system may be programmed to report that it is unable to calculate the position of the transmitter using the available data.

If the iteration converges, however, studentised residuals are preferably calculated for the distances, and the system preferably determines the variance of the distance data.

Reflected signals will tend to produce large value, so that if the variance is below a predefined, acceptable level, the system can be programmed to conclude that all erroneous signals have been identified and eliminated.

If the variance is greater than an acceptable level, signals derived from the receiver associated with the distance that has the largest positive studentised residual is assumed to have resulted from at least one reflection and these signals are first excluded from consideration. The system is programmed to attempt to fit the model again.

This procedure involving the deletion of receivers and signals from consideration is repeated as necessary, until the variance of distance data from the remaining detectors is sufficiently small.

This process is of course only valid if a large enough number of signals/receivers still remain when the small variance is noted.

At any stage in this process, it may be found that the geometry or number, or both of the remaining receivers under consideration is insufficient for a three-dimensional position for the transponder transmitter to be calculated. For example, all the remaining receivers may be in line.

If this occurs, the system is adapted to abort the computation and report that insufficient information has been gathered to fix the position of the transmitter at that time.

In an application of this procedure, when the system criteria indicate that all receivers that may have detected an erroneous signal have been eliminated from consideration, a non-linear regression model has been fitted to the distances calculated from the pulse times determined by the remaining receivers, and a transponder transmitter position has been found, the system may use this information for various purposes, or it may transmit the information to other interested parties.

Before transmitting a second slow speed signal the system preferably waits for reverberations of the previous distance-measuring pulse to die out before attempting to repeat the above procedures to get another fix for the transponder transmitter position. Obviously, the time the system must wait for this to happen will depend on the characteristics of the transmission medium and the transmitter's environment. This may be determined empirically, or by adaptation such as by self-learning.

In one embodiment of the present invention, there is provided a detection system for determining information concerning at least the position of an object, using signal pulses respectively of high and slow propagation speeds, comprising at least three fixed, non-collinearly distributed slow speed signal responsive receivers, at least one transponder transmitter unit for transmitting slow speed signal pulses, mounted on the object, means for generating and transmitting high speed signal pulses to synchronise signal pulse transmission from the transponder with the commencement of a reception-sensitive period at a receiver and means for computing signal pulse reception times and correlating differences therein to determine the required information about the position of the object.

In another embodiment, a separate transmitter is located on each of two or more objets in the specified environment and each transmitter includes a high speed signal responsive receiver adapted to respond to only one of a plurality of high speed signals, and the separate transmitters are triggered in sequence by a transmitter of high speed signals which is adapted to transmit uniquely one of the plurality of possible high speed signal at the beginning of each timeframe.

The invention can be adapted to identify and log movements of two or more objects in the same area/space, by mounting a transponder transmitter on each object and providing each transponder with a unique address, so that each transmitter can be triggered in turn and the position of the relevant object determined in a sequence.

It is not only necessary to trigger transponder transmitters uniquely, but also necessary to restrict transmissions from multiple objects so that they do not interfere with each other, by making sure that the transmissions do not overlap in time in the same space.

In accordance with the invention, this is arranged by a coordination device which addresses the transmitters, and sends address information to them as part of a regular timing synchronisation signal. For example, the slow speed signal transmitters, each with their own high speed signal receiver and unique address, could be placed on the objects to be located, and access to th space in which the distance-measuring pulses are transmitted is divided into discrete timeslots, the duration of each timeslot being the time needed for reverberations of pulses to die down. At the start of each timeslot, the coordinating device is adapted to send out a high speed timing-synchronisation signal (typically a radio signal) which consists of an address and a timing pulse. All the transponders on the objects will receive this signal, and each compares the received address with its own. If the addresses are the same, that transponder one transmits a slow-transmission-speed distance measuring pulse, when the timing pulse is received.

The frequency at which addresses are transmitted by the coordinating device may be varied, either during set-up, or based on information obtained from previous addressings.

Thus during set-up an object which will normally be static and remain for long periods of time in one place, can be identified as such, and its address only transmitted infrequently—say once every 5 minutes or once every hour. However objects which it is known in advance are likely to move (or be moved) within the space, can be identified as mobile, and their transponder addresses transmitted more frequently—eg once every minute, or every few seconds, or even more often if the system capabilities permit.

In a more sophisticated arrangement, a memory in the coordinating device may be used to store against each address, an item of information which indicates the frequency of position changes, for that address, detected by the system during some predetermined period of time (which might be minutes, hours or days depending on the environment and the nature of the objects carrying the transmitters). The stored item of information is employed to determine how often each address is broadcast. If the item of information changes in value, indicating an increased or decreased frequency of movements of the address within the space, the coordinating device can respond appropriately and increase or decrease the frequency of transmissions of the address received.

The system can also be used to determine the true orientation of an object, by comparing the position of two or more transponder transmitters mounted on the object.

If an object is rigid and stationary (or moving slowly or predictably enough) and a number of transmitting elements are placed at known points on the object, the positions of all the transmitters can be found in three dimensions. Since the fixed spatial relationship between the transmitters on the object is known, as well as their measured positions in three dimensions, it is also possible to determine the orientation of the object.

Depending on the knowledge of the capability of movement of an object, one or more transponder transmitters located thereon will enable the position and orientation of the object to be determined. Thus an object mounted for rotation about a fixed axis and only capable of that movement will generally only need one off—axes transmitter to be mounted thereon to allow its rotational position to be computed.

If two spaced apart transmitters are mounted on an object, more information about rotation and position can be determined to advantage.

If orientation is to be determined efficiently and quickly, it is preferable to cause the two or more transmitters on the object to transmit in succession.

If the object is moving, then the same pattern of addressing is preferably maintained so that changes (caused by movement) in the actual and/or relative positions of the transmitters will be as small as possible, and the most accurate description of each orientation as well as the movement of the object will be obtained.

A preferred embodiment of the invention comprises a system for determining the position of an object in a specified environment in which the transit time is determined of slowly propagating measurement energy transmitted from a transmitter on the object to a plurality of receivers positioned at fixed points in or around the specified environment, and in which the distance of the transmitter from each receiver is computed from the times taken for the measurement energy to propagate from the object to some of the receivers, and wherein the slowly propagating measurement energy is initiated by a trigger burst of energy having a higher speed of propagation from a master transmitter which is located so as to transmit trigger bursts into the environment to initiate the measurement energy transmitter on the object of interest, and wherein a plurality of such transmitters are located on different objects and/or points of the same object within the environment, and each transmitter of measurement energy is associated with and controlled by signals from a receiver responsive to trigger burst transmissions, and the latter are encoded and/or transmitted at different frequencies so that the receivers located throughout the environment can be individually addressed from the master transmitter, characterised in that a coordinating control system is provided for determining the order in which the object mounted transmitter/receiver combinations are to be addressed and triggered by the transmissions from the master transmitter, together with memory means for storing relevant information about the different combinations with reference to their addresses, by which the order can be determined.

The coordinating control system memory means typically stores a unique address for each of the receiver/transmitter combinations, and the control system is programmed to encode the transmissions using the address information so as only to address the transmitters individually.

Preferably in addition to the unique address for each receiver/transmitter combination, at least one additional item of information (a weighted hierarchy indication for schedule positioning, or "WHISP") is stored in a manner which can be associated with each unique address, and the control system is programmed to select from the addresses that of the receiver/transmitter combination next to be polled, using the WHISP values to determine the order of addressing.

The coordinating control system may be separate from or form an integral part of the master transmitter.

WHISP Options

A WHISP may be stored for each unique address, and it is the WHISP which must be changed to adjust the subsequent addressing of the transponders.

Alternatively a set of standard WHISPS may be stored and an association between each unique address and one of the standard WHISPS is stored for each unique address, so that an appropriate WHISP is linked to each unique address. In that event only the associations need to be changed so as to influence the subsequent addressing or the transponders. Likewise a change to one (standard) WHISP will mean that all the associated addresses will be given a new hierarchial position.

For complete flexibility unique addresses, WHISPS, (and/or the associations between unique addresses and WHISPS) can all be changed to allow for the entry or exit of transponders into and out of the environment, and to alter the manner in which those in the environment will be addressed by the coordinating control system.

In one example the WHISP may be a simpler logic 1 or 0 to indicate whether the transponder combination is to be addressed or not.

The WHISP may comprise a priority or weighting measure to determine the order or rate at which the transponder is to be addressed.

The WHISP may comprise two items of information, firstly for example the length of time since the transponder was last addressed (which may be continually updated by clock information) and secondly for example a rate of interrogation figure to be achieved by the system for that transponder.

Assembly of Address Lists (Scheduling)

The coordinating control system may compile a list of transponders to be addressed in a sequence by interrogating all of the unique addresses and their related WHISPS and compiling the order in which they are to be interrogated using the current WHISP information.

Thus in one arrangement the coordinating control system may create a schedule of unique transponder addresses using the WHISP data, and arrange the order of the addresses in the schedule, and therefore the order in which they are to be interrogated. The schedule is then used to determine the encoding of each trigger burst from the master transmitter and the order in which the transponders are thereby interrogated.

In this arrangement, updating may be performed in two different ways. Thus in one mode, any changes which are required to be made to WHISP data may be held over pending the end of the interrogation of the current schedule of addresses, whereupon the WHISP data is updated prior to the compilation of the next schedule.

Interruptions to Scheduling

In an alternative mode, a change to a WHISP may be permitted to interrupt the running of a particular schedule if the unique address or addresses associated with that WHISP is/are still to be interrogated, but is held over to update the WHISP data before the next schedule is compiled if the particular address or addresses has/have already been interrogated in the current schedule.

In either mode, the system may include an emergency override to allow the transponder triggering in accordance with the current schedule to be terminated immediately, and for a new schedule to be immediately compiled, taking account of the WHISP change associated with, or entered with or after, the emergency override instruction.

Dynamic Scheduling

An alternative and more flexible approach to scheduling involves merely determining from all available data existing just before the next trigger transmission is due, the next transponder address which should be interrogated, using a suitable algorithm and high speed processing, and the development and implementation of one particular algorithm for performing this function is set out below.

Determination of Dynamic WHISP Scheduling

Changes to WHISP data may occur as a result of a lapse of time, the arrival o a particular time or date, or by interaction with an application running on a computer (which may be part of the position determining system, or the coordinating control system, or another computer altogether), or by, the entry of data by an operator for example to indicate that the system should cease its scheduled transponder position determining function and for example seek one particular transponder (which may for example relate to that on a particular person or object believed to be within the environment).

Additionally or instead, environment related information may be allowed to create an interruption to permit or cause WHISP data to be altered, such as an increase or decrease in temperature, light level, or sound level or like, either within the environment or within a separately monitored environment, or by transducer originating signals linked for example to the movement of an object either within the environment; within an adjoining environment; or for example by the opening of a door communicating between one environment and another.

Independent Movement Sensing

The movement of an object within the monitored environment or an adjoining environment may we detected by means of a movement sensor such as a trembler switch, associated with the object. If so a radio or hard-wired communication channel may be required between the sensor and the coordinating control system.

WHISP Data Changes

References to changes to WHISP data, include changing the WHISP data stored in a unique memory means linked to one of the unique addresses, or changing the association between a transponder address and a plurality of standard WHISPS, depending on whether a separate WHISP is stored for each address, or whether a number of standard WHISPS are stored and associations between them and the different event transmitter addresses are stored.

Operation of the Scheduler

According to another aspect of the invention, the scheduler may be adapted not only to determine the order in which the transponders are to be interrogated but also the rate of interrogation of any one transponder.

This may for example be a fixed rate associated with the particular transponder address, which rate is entered as a second item of information in each WHISP.

Alternately in another example, the second item of information may be an adjustable rate value, which can be altered in relation to variations in a parameter monitored by a transducer or sensor. The parameter may for example be temperature, light level, sound level or the like, or may be a value which can be adjusted by an operator, or in relation for example to a parameter such as the time, or the date.

According to a particularly preferred aspect of the invention the rate parameter associated with each WHISP itself may be a dynamic variable, whose instantaneous value is determined for example by whether a variation has occurred in the detected position of a transponder carried by an object.

Resource Allocation

If the object(s) are stationary, the position(s) of the transponder(s) carried by the object(s) will be substantially identical each time the system interrogates the relevant transponder(s). By comparing the last noted position(s) with the current noted position(s) and applying a tolerance band to cover minor variations introduced by the measuring process, the system can be programmed so as to reduce the frequency at which any one transponder (or group of transponders) is interrogated, down to a relatively low level, thereby reducing the traffic on the system and allowing more time to be available for more frequent interrogation of transponders positioned on objects which are moving, and whose positions therefore are likely to vary from one reading to the next.

In order to monitor a rapidly moving object interrogations spaced by less than a second may be needed in order to track its movements, and it is of great advantage to reduce the rate of consideration of transponders on other objects which are essentially static, or only moving very slowly or in a predictable pattern.

Tracking Rate Variation

According to another preferred feature of the invention, the system may be programmed to utilise a third item of data within a WHISP, and to increase the tracking, (ie frequency of interrogation) of a transponder of a first object if a second object having such a third item of information stored as part of its WHISP is perceived by he position determination of the transponder on the second object, to have moved close to the first object.

Thus for example the WHISP of a transponder address of a human being may carry such a third item of information, so that if the transponder linked to the person concerned is seen by the system to approach an object which is normally stationary and whose transponder would otherwise be interrogated perhaps only once every 5 minutes, the interrogation rate of the transponder associated with the stationary object may be increased in anticipation of the possibility that the person may suddenly move it.

Thus by allowing for the instantaneous adjustment of the next transponder address which is to be interrogated, a fully dynamic system can be created since it allows the scheduler to alter not only which transponder is to be interrogated but also the rate at which different transponders are to be addressed with complete flexibility, thereby to follow changes and developments in an environment, with little or no delay. The system can therefore be thought of as having very low hysteresis and by including pre-programmed items of information in each WHISP, which can alert the system to the likelihood of changes occurring, so sudden changes in the environment can be followed almost immediately they occur.

Basic Assumptions to Allow Algorithm Parameters to be Determined

By way of example let us consider a location system that uses a set of ultrasound receivers placed at known positions on a ceiling in a room to detect ultrasonic signals from an ultrasound transmitter attached to an object in the room. By determining the times-of-flight of those signals from the ultrasonic transmitter to the ultrasound receivers, we may calculate in the three dimensions the position of that object in the room. The a system can be extended to locate more than one ultrasonic transmitter in the room, provided each has a unique address so that they can be triggered separately, typically by serially polling the transmitters.

In order to accurately measure the signal flight-times, a central coordinating device triggers the transmitter, at the same time as a reset signal is sent to the ultrasound receivers, typically over a wired network. Synchronisation between the transmitting and receiving elements of the system is thus achieved. To ensure that only one transponder is triggered (where two or more transponders exist in the room and so as to prevent the confusion that would be caused if ultrasound receivers were to detect ultrasound signals from more than one source), each ultrasonic transmitter is controlled by a radio receiver and is triggered by the transmission of a suitable radio signal into the room. Each receiver includes a unique address. The radio signal contains one such unique address. Upon receipt of the radio signal, each radio receiver compares the transmitted address with its own, and, if the addresses match, its ultrasonic transmitter is triggered to emit a short pulse of ultrasound.

The central coordinating device has to allow for reverberations and reflections of each transmitted pulse ti die away (so that the ultrasound receivers detect ultrasound from only one source) before triggering another ultrasonic transmitter. For a typical room, the time needed to allow all such sounds to die away can be of the order of 20 ms.

It can be seen, therefore, that there is a limit on the number of ultrasonic transmitters which such a location system can trigger in any time period. The time between each radio addressing message is called a timeslot, and only one transmitter can be interrogated and triggered within each timeslot.

Efficient distribution of the timeslots between ultrasonic transmitters to be located is clearly a priority, and this distribution should take account of the different rates at which location information about particular objects is desired. For example, the system might normally monitor transponders carried by people (who move often) at least once each second, whereas it might monitor those attached to desks, filing cabinets or workstations (which move infrequently) only once a minute. If, however, a monitored person walks up to a particular workstation, the system may be programmed thereafter to monitor that workstation's position once a second at least while the person is noted as being in the vicinity, because it is then more likely to be moved.

A further constraint on the allocation of timeslots can arise when members of a group of transponders need to be interrogated in consecutive timeslots. This is advantageous when the positions or the transponders in the group are to be used to determine both the location and orientation of an object, such that any motion of the object between readings can make the derived information inaccurate.

As mentioned above, the process of timeslot distribution is called scheduling, and software, typically in the form of an algorithm for performing this function, will be called a Scheduler.

The priority level assigned to each different transponder is called its Location Quality or Service (LQoS).

The LQoS of a transponder may also be changed at any time, and subsequent timeslot allocation needs to take account of any such changes.

The Scheduler provided by the present invention is designed to accommodate LQoS changes; to have the appropriate long term behaviour; to assign timeslots to transporers based on their Location Quality of Service (LQoS); and furthermore to deal with service demands which are greater or less than the system capacity, by scaling excessive requests fairly in the former case, and padding with dummy timeslot assignments in the second. It is also capable of adjusting timeslot assignment to allow a group of transponders to be located consecutively.

Scheduler Implementation

Let us consider a system having the following parameters:

(1) The length of a timeslot is 40 ms (ie the system is capable of determining 25 positions per second)

(2) The transmitters each have a unique 16-bit address (3) The reserved address 0 is not allocated to any transmitter.

(4) Every transponder is also a member of one transponder group, also identified with a 16-bit number (again, identifier 0 is reserved)

(5) The scheduler is a CORBA-based distributed software programme (Object Management Group, The Common Object Request Broker; Architecture and Specification. Revision 1.1, OMG Document number 91.12.1, December 1991) running on a workstation.

(6) Location Quality of Service (LQoS) is expressed as an integer representing the desired period of positioning (eg an LQoS of 25 requests one position every 25 timeslots, ie once per second).

In accordance with the invention, the Scheduler is adapted to maintain a scheduling table stored in memory. Each row of the table contains six entries:

1. A 16-bit transponder address, a
2. A 16-bit group identifier for the transponder, g
3. The LQoS for the transponder, l
4. A real number called the Effective LQoS (or ELQoS), e
5. A real number called the score, s
6. A bit called the slotswap bit, b.

A row in the table is described by an ordered six-type (a,g,l,e,s,b). A global flag called "excess-demand" (to be described later) and an integer called "last-group" are also maintained by the Scheduler.

When the Scheduler process is initialised, the scheduling table is empty. A single row (0,0,1,1,0, false) is immediately added. This entry represents a dummy transponder. The excess-demand flag is set to false, and the last-group is set to zero.

Adding or Changing a Request

An operator (user) or software application can contact the Scheduler over its CORBA interface to indicate that the location requests for a transponder group should be added or changed. It should be noted that if two or more transponders are members of the same transponder group then their location requests should not be capable of being added or changed separately. Furthermore, the requests involving the dummy transponder address 0 and dummy transponder group ID 0 will be ignored. The user or application passes the following information to the scheduler:

g, the transponder group identifier l, the desired LQoS for members of this transponder group $a_1, \ldots, a_n$, the transponder address of members of this transmitter group.

For each transponder address $a_1, \ldots a_n$, the scheduler then adds or modifies an entry in the scheduling table.

For values of i between 1 and n, if a row of the form $(a_1, g_1, l_1, e_1, s_1, b_1)$ is present in the table, it is updated to $(a_1, g, l, e_1, s_1, b_1)$, otherwise a row $(a_i, g, l, \mathbf{0}, \mathbf{0}, \text{false})$ is added.

The scheduler is then arranged to recalculate the ELQoS for each of the m entries in the table.

First, it calculates the total level of LQoS demand, (t), where t is given by Equation (1).

Next it updates the ELQoS for each of the n entries in the scheduling table, $e_i$, with a new value $e'_i$. If t is less than 1, then $e'_i$ is given by Equation (2).

Otherwise, if t is greater than or equal to 1, $e'_i$ is given by Equation (3).

Deleting a Request

When a user or application contacts the Scheduler over its CORBA interface to indicate that a location request for a transponder should be deleted, it also passes the address of that transponder $a_i$, to the Scheduler. (The entry corresponding to transponder address 0 may not be removed). If the scheduler finds that an entry for that transponder is present in the table, it removes the corresponding row $(a_r, g_r, e_r, s_r, b_r)$ from the table. The scheduler then updates every other row in the table $(a_x, g_x, l_x, e_x, s_x, b_x)$ to $(a_x, g_x, l_x, e_x, s'_x, b_x)$ where the value of $S'_x$ is given by Equation (4), In Equation (4) n is equal to the number of rows in the table before removal of the location request. The scheduler recalculates the effective rates based on the remaining table entries as described in the previous section.

Allocating Timeslots

Once every 40 ms, the Scheduler must tell the central coordinating device (across a CORBA interface) the address of the transponder which should we located next. It does this by examining the contents of the scheduling tabe and any attempts to update the table are blocked until this examination is complete.

First, the scheduler steps through each row in the scheduling table. If the last-group register does nor contain 0, and the scheduler encounters a row in which the transponder group ID is the same as the contents of the last-group register, and in which the swap-slot bit is false, it sends the transponder address contained in that row to the coordinating device, and sets the swap-slot bit on that row to "true".

Otherwise, the Scheduler operates in accordance with the following algorithm: (5)

1. Choose the row in the table with the highest score $(a_c, g_c, l_c, e_c, s_c, b_c)$.

2. If $b_c$ is false, for each row of the table which has the transmitter group ID $g_c$ set the swapslot bit to false. Then, update each row in the table $(a_x, g_x, l_x, e_x, s_x, b_x)$ to $(a_x, g_x, l_x, e_x, s'_x, b_x)$ where $s'_x$ is given by $$s'_x = (s_x + 1/e_x)$$

Next, the single chosen row in the table is further updated to $(a_c, g_c, l_c, e_c, s''_c, b_c)$ where $s''_c (= s'.c-1)$.

The lastgroup register is set to $g_c$.

Finally, the coordinating device is informed of the address $a_c$ of the transponder that should be located next (if $a_c$ is zero, this indicates that no transponder should be addressed in the next timeslot)

3. If $b_c$ is true, update each row in the table $(a_x, g_x, l_x, e_x, s_x, b_x)$ to $(a_x, g_x, l_x, e_x, s'_{,bx})$ where $s'_x$ can be computed as above. Next, the single chosen row in the table is further undated to $(a_c, g_c, l_c, e_c, s''_c, \text{false})$ where $s''_x = (s'.c-1)$. The row in the scheduling table with the highest score is chosen again, and the above steps are retaken.

Rotational Movement

The relative positions of two or more transponders carried by the same object can be checked against the previous known positions to determine whether or not the object has for example been rotated.

According therefore to another feature or fine invention, a set of two or more transponders which are carried by the same object can be identified as such with a further item of information in their associated WHISPS, such that the control system will schedule the interrogation of second and any subsequent transponder addresses of the set of transponders on the object after the first of the pair has been interrogated.

By interrogating the set of transponders on an object in rapid succession so any relative movement between position determination of each point is minimised, rendering the orientation picture of the object from each such succession of position determinations to be as accurate as possible.

In general three transducers are needed to permit the orientation (and any changes in orientation) of an object to be determined. For some objects normally constrained to occupy a limited range of positions only two or even one transducer may be sufficient.

The invention also lies in apparatus for performing any of the above methods, and in particular comprises a master radio transmitter for transmitting short duration radio frequency trigger signals into an environment; a plurality of radio receiver-controlled ultrasound transmitter units (transponders; located on movable objects throughout the environment; a plurality of ultrasonic receivers located at fixed, spaced apart points in the environment and adapted to receive ultrasound signals from transponders in the environment; a coordinating control system adapted to cause the master radio transmitter to emit appropriately encoded trigger signals to trigger one particular transponder (if present) in the environment, and cause it to emit ultrasonic radiation; and a computer based data processing system receptive of signals from the ultrasound receivers for determining from the transit times associated with those transmissions the apparent line of sight distances of the transponders from at least some of the receivers, and thereby from the geometry of the receivers the apparent position of the object in the environment; memory means for storing position data for each such identified transponder and therefore the object on which it is mounted; scheduling means for determining the encoding of the next radio trigger transmission, and therefore the address of the next transponder whose position is next to be interrogated; additional memory means for storing at least one additional item of information in association with the position data of each transponder; and programmable data processing and/or logic means for determining from the said additional items of information and/or from at least one previously interrogated transponder address, which transponder address is to determine the next encoding of the radio trigger transmission.

In a preferred arrangement, further memory means is provided within which is stored data relating to the time at which each transponder address was last interrogated, and the programme running in the processor controlling the said logic means is adapted to compare the information stored in each said further memory means with the WHISP data for all transponder addresses suspected to be in the enviroment, to determine which of the transponders is next to be interrogated, and to encode the next radio trigger signal accordingly.

The different memory means may comprise different parts of one memory device (such as a large random access memory) or may be formed from two or more different memory devices, at least some of which may be random access memories and others may be programmable read only memories.

Reduction of Errors Due to Spurious Acoustic Signals

Obviously any acoustic noise sources in the environment which can generate ultrasonic signals similar to those sent by the ultrasound transmitters, have the potential to introduce false position determination.

In order to overcome this problem, and in accordance with another feature of the invention, the ultrasonic receiver is rendered sensitive only to sound of a particular frequency, by the use of an ultrasonic detector with a narrow bandwidth around that frequency, and the bandwidth of the sound signal emitted by the transmitter is also limited to a narrow bandwidth around that frequency, and wherein the system includes a further ultrasonic receiver adapted to simultaneously monitor sound at at least one of a number of different frequencies, and a logic based system determines if signal detected by a receiver at the unique frequency used by the transmitter is accompanied by other sounds at some or all of the said different frequencies and if not, the detected signal is identified as being TRUE, and if accompanied by other sounds, the detected signal identified as being corrupted by noise.

Thus for example noise sources in the environment (for example, a set of jangling keys) tend to simultaneously generate signals at a large number of different frequencies, so that sounds are detected at the transmitter frequency and at other frequencies simultaneously. The detection of such a range of sound signals (even though it contains a component at the transmitter frequency) has to be identified as either a FALSE sound signal or is as a TRUE signal which has been corrupted by noise, and in either event the signal must be rejected.

The number of additional frequencies that are monitored is preferably greater than one, and the monitoring may be performed at one or more of a number, of different points in the environment.

Orientation Determination

In some circumstances, a plurality of transponders may be attached to the same object. Thus if three transponders are attached to a rigid object so that they are not colinear, then by finding the positions of those three transponders not only the position but also the orientation of the object may be deduced (assuming that no movement of the object has occurred between the time at which the measurements were made).

Component Redundancy Reduction

Typically each transponder has its own independent radio interface, controlling log, and one or more ultrasonic transducers. However, where two or more such transponders are placed on an object, complete physical independence of the transmitters is not required and components of different transmitters can be interconnected using wires and duplication of components which are common to the transponders can be reduced or eliminated.

According to one aspect of the invention, a single radio receiver may be provided together with decoding logic to drive a number of individually addressable ultrasonic transducers. Thus the one receiver will respond to more than one address and hence can be described as a Multiple-Address transponder but for each address only one of the ultrasonic transducers would be triggered, corresponding in each case to one of the points on the object.

The invention thus envisages an object having mounted thereon a plurality of ultrasonic transducers located at a corresponding plurality of different non-colinear positions on the object, and a single radio receiver adapted to trigger one or another of the transducers depending on an address code contained within a radio signal received thereby, so that the different transducers may be triggered by appropriately coded radio signals, to transmit ultrasound signals into the environment at specific times, and from the different points on the object, to enable the unique positions of the said points on the object to be determined and enable the orientation of the object to be determined.

The invention also envisages each transducer as being comprised of a group of two or more similar transducers facing in different directions to more uniformly spread the ultrasound around the environment.

Ultrasonic Transmitter Design

In a preferred embodiment, the basic ultrasonic transmitter incorporates a plurality of ultrasonic transducers which are driven simultaneously to create a pulse of ultrasound from the device.

Typically, the transducers (which, individually, have a relatively narrow beam angle) are arranged to point in different directions so as to generate a generally omnidirectional transmission pattern. However, it is possible to arrange the transducers so as to produce a more directional beam, and two advantages follow:

1. The number of transducers required can be reduced. This is especially relevant if a transmitter is to be placed on an ultrasonically opaque object in such a way that if an omnidirectional signal were to be generated by the device a known fraction of the omnidirectional signal would be absorbed. A directional beam extending over the area not absorbed by the opaque object can therefore be generated using fewer transducers than would have been required to generate the omnidirectional signal, but the ultrasound signal issuing from the object will appear to be the same, as if an omnidirectional source had been employed.

2. The orientation of an object may be determined by identifying the positions in the environment at which receivers are located which receive signals from a transducer or the object. Thus directional transducer on the front of a computer monitor may be sufficient to enable the direction in which the screen is facing to be determined, by mapping which of the receivers on the environment "hear" the transmitted ultrasound.

Power Saving

Standard operation of each transponder leaves the radio channel open continuously. This technique ensures that it will receive all addressing messages from the coordinating device, but if the transponder is battery powered it is also disadvantageous, in that power is used continuously by the radio interface and the batteries will become rapidly discharged.

According to another aspect of the present invention, the transponders are made aware of the fixed interval which is to occur between addressing messages and power saving is achieved by turning off the radio interface after a message is received and switching it on just before the next one is due.

This may be achieved by providing the transponders with a low-power supervisory circuit which can turn the radio interface on and off.

Further power saving may be achieved if the frequency with which a particular receiver-transmitter will be addressed by the coordinating device is known. If the coordinating device as programmed so as to be aware that the transponder will not be addressed for some amount of time, it can encode that time in the radio message, and after decoding the message the transponder will be able to switch off its radio interface for that amount of time. The power savings is particularly efficient if a transmitter is made to "sleep" for a long time, as would be the case if the transponder is being used to track, an item of office equipment such as a printer, which is not expected to move very often.

The scheme described above can be extended so allow sleeping transponders to be woken up at short notice. Thus in the case in which the coordinating device is sending out 50 addressing messages each second, the transponders can be configured so that they turn on their radio interfaces once a second, at a time when a message is due, and decode that message (therefore using $1/50$ of the power which would have been used if they had decoded each message). A data bit at the start of each message (the wake bit) indicates that the coordinating device wishes to wake up all sleeping transponders or a set of sleeping transmitters (say, all those with even addresses). If a number of bits can be transmitted at the beginning of each transmission, the "sleeping" transponder can be grasped and woken up accordingly by transmitting an appropriate code, within the capability of the bits. If a sleeping transponder receives such a message, and if that message is applicable to it, it will wake up, and from that time on check every addressing message from the coordinating device, until such time that it is instructed to go to sleep again. With this method, much of the power-saving advantage of sleeping can be retained, and yet it can quickly trigger transponder so as to be able to determine its location. Thus in the case of the printer described above, if a person walked up to the printer, it is likely that they might move the printer, and in which event it may need to start tracking it immediately, even if it was currently "sleeping" to save power.

If a transponder is taken out of range of the master radio attached to the coordinating device, there is no point in it continually turning on its radio interface, for it will be unable to receive addressing messages. Therefore, in order to save power in these circumstances, if a transponder does not receive an addressing message at a time when one is expected, then it can be programmed to go into sleep mode for a predetermined period (perhaps one minute), before turning the radio channel on again for sufficient time to detect whether it is in range of the coordinating device again. For example, if the coordinating device was sending out an addressing message every $1/50$ second, then a sleeping transmitter must wake for $1/50$ second to determine if it is in range of that coordinating device. If it did this once a minute, then the radio interface would use only $1/300$ of the power it would otherwise use. This is achieved at the expense or up to a one minute delay before a transponder's position can be determined after it is back in range of the coordinating device.

Registration of New Transponders as They Enter an Environment

It is desirable for such a system to be able to cope with the introduction of a previously "unknown" transponder unit without operator intervention. In this situation there is a requirement to indicate to the overall coordinating device that it must start to address the new transponder. This process will be referred to as a "registration". It is merely necessary that the new transponder is compatible with and has a radio address which is one that would be expected and recognised by, the system.

In order to do this and in accordance with a preferred feature of the present invention, a bi-directional radio link is provided between a remote receiver and each transponder. Typically this is achieved by adding a radio transmitter to each transponder and adding a radio receiver to the master transmitter. Such transponders will be referred to as bi-directional transponders.

In one arrangement the coordinating device may for example transmit the radio receiver addresses in sequence of all possible bi-directional transponders, at regular intervals. The bi-directional transponder radio responses may be checked for radio responses from any new transponder addresses, and these addresses may then be added to the list of bi-directional transponder addresses which are to be scheduled, for position determination by subsequently triggering by radio their bi-directional transponder so as to generate ultrasound signals.

In a more preferred arrangement a "Slotted ALOHA contention-resolution protocol" such as described by Roberts L in ALOHA Packet Systems With and Without Slots and Capture, Computer Communications Review, April 1975, may be used to allow the transponder to identify its unique identification (ID) to the coordinating device and establish its position in the schedule for the master transmitter.

This type of protocol is a probabilistic protocol which allows many transmitting and receiving devices to use the same radio channel to transmit at the same time. This allows a plurality of transponders to use the same radio channel to communicate with the coordinators and enter their ID's into the schedule to be used by the master transmitter.

Preferably the contention-resolution protocol is performed until an indication is received from the master transmitter and/or its associated coordinator that location resources have been allocated to the new ID for that transponder transmitter.

This indication may be sent as part of the addressing message.

The indication may simply be a command to transmit or a separate acknowledgement field.

In either case, the transponder's unique radio receiver ID may be encoded in the message to show that the master transmitter and/or coordinator is aware of its presence.

Resource Retrieval

This has been referred to above, and in accordance with another feature of the invention, "registration" may also be used in resource retrieval to prevent valuable resources being used unnecessarily.

Thus if a bi-directional transponder is moved to a location where its ultrasonic signal is undetectable (e.g. if it is placed in, a box) then the coordinating device may be programmed to reallocate the location resources that were are being used to track that device.

For example if no ultrasound signal from a bi-directional transponder has been detected after it has been addressed for say up to four times, the coordinating device may be programmed to set a "transmit" bit in the radio addressing message the next time it is transmitted by the master transmitter, so as to force a registration from the addressed transponder transmitter, whilst blocking registration attempts from any other bi-directional transponders.

If a radio reply from the bi-directional transponder transmitter is detected by the master radio receiver in response to a "transmit bit", then the related object mounted transponder is still in range of the master radio transmitter, and the absence of an ultrasound response either lies in a temporary shielding of the transponder or an electrical failure, (as opposed to movement of the object), and the resource should not be reclaimed. In the example given the transponder may have been temporarily shadowed by ultrasound absorbing material.

If no signal is detected, then the next time that bi-directional transponder is addressed by the master radio transmitter the coordinating device may be programmed to set a special drop bit in the addressing message, to indicate that the location resources that are currently allocated to that transponder will be reclaimed, and the transponder concerned will not subsequently be addressed via the master transmitter radio link.

If the transponder radio receiver can receive this message, it must be in a location where it can receive radio signals from the master radio transmitter but the coordinator is unaware of its ultrasonic response. In this event the bi-directional transducer is programmed to perform the registration process described above, but in the meantime the coordinating device reclaims the now unused location resource associated with that ID, until such time as the transducer achieves registration.

The use of a drop bit dictates that the radio interface should be very reliable, since if a transponder were to miss a message telling it not to expect any more radio addressing transmissions this could result in the transponder not starting the registration process, and, without other intervention, no further position updates would be received for that transponder.

According to a preferred feature of the invention, each addressing message contains one or more sets of error-correcting or error-detecting bits in combination with a powerful checking algorithm (e.g. CRC Check).

If a transponder receives a message containing errors, it is programmed to assume that the message was destined for it, and that the drop bit was set, so that if a transponder receives such a message, it will immediately begin the registration process.

Whether there are merely a number of independent but interlinked regional coordinators, or an overall coordinating device which sits above a plurality of regional coordinating devices, either the overall device or all of the regional coordinating devices (or both) may be programmed to remember the ID's of any bi-directional transponders which have dropped out, and this fact may be compared with a look up table of data, indicating whether or not an alarm is to be raised and/or the absence noted in a display. For example in the case of an ID associated with a valuable piece of apparatus, a burglar alarm may be sounded, and exit down remotely locked.

Likewise, if an ID is discovered in a region in which it should not be (eg a person or a container of dangerous material) then the overall coordinator (or the regional coordinators) may likewise be Programmed to raise an alarm, bar access or exit, and/or display this in a display.

Transmission of Additional Information

According to another feature of the invention, input and output facilities may be provided on the transponders.

For example, in addition to the address of the device that is being requested to transmit the ultrasonic pulse, a radio message from a coordinating device may contain a number of data bits (an "Output Data Value") which may, for example, be sent to an output port on the addressed transponder, to control for example a display, or robotic device associated with that transponder.

BRIEF DESCRIPTION OF THE DRAWINGS

The invention will now be described by way of example, with reference to the accompanying drawings, in which:

FIG. 23 is a detailed block schematic of a mobile transponder unit such as is mounted on objects in the rooms in the system of FIG. 18;

FIGS. 24 to 36 are Equations (1) to (13), respectively; and

FIGS. 37 and 38 are Tables "A" and "B" respectively.

OVERVIEW OF THE DRAWINGS

Figure 1:
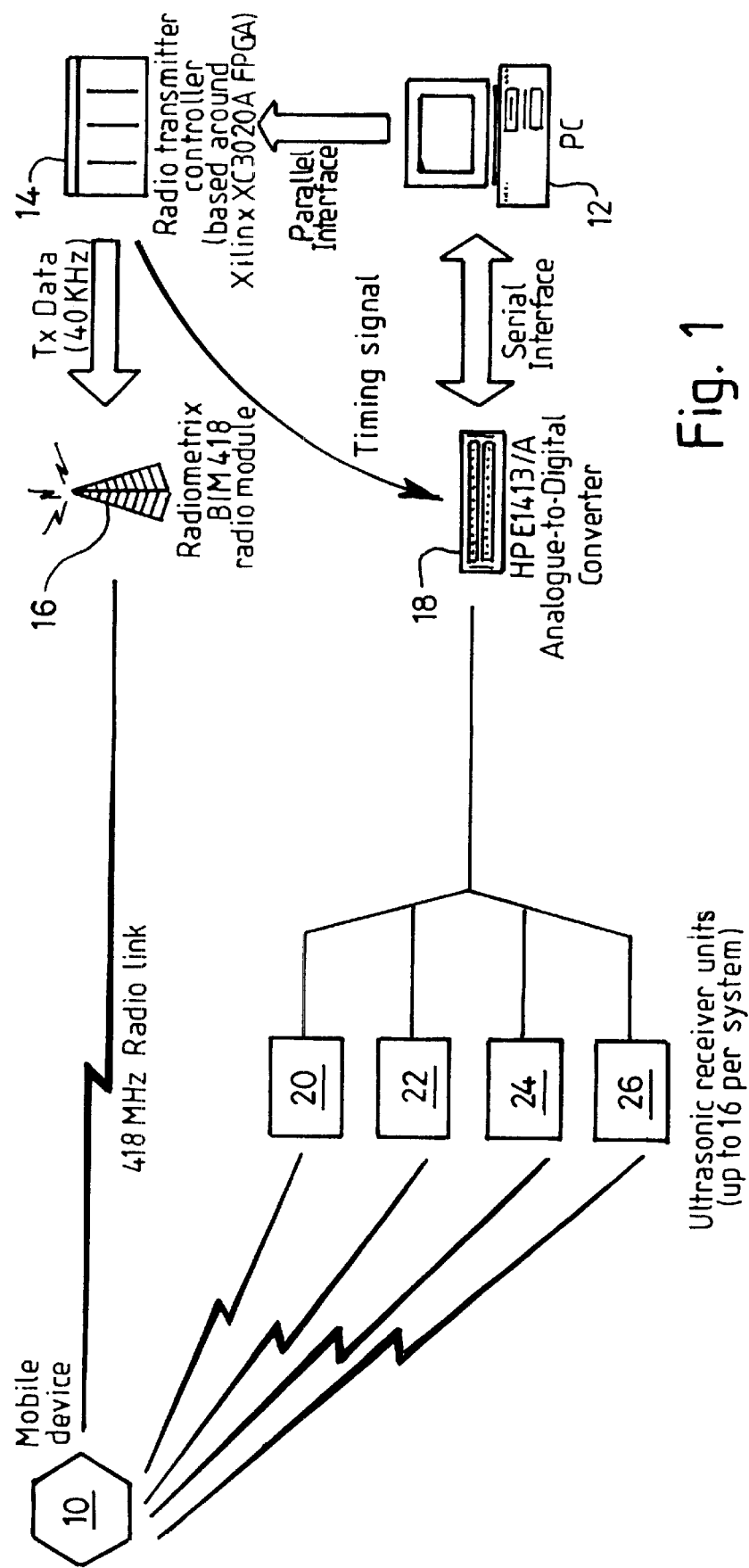
FIG. 1 is a schematic diagram of a positioning system.

In the drawing a set of ultrasonic receiving elements are placed in a matrix on the ceiling of rooms in which the system is installed, and ultrasonic transmitters are placed on the objects to be located.

An addressable radio link is used to allocate timeslots, transmit the synchronising timing pulse, and allow transmitting elements to communicate with a coordinating device, eg to register an initial presence.

Waves are used because their speed of propagation is very fast, and unknown delays in the radio link will be very small compared to the time-of-flight of, for example, ultrasonic pulses used to measure distances so that to a first approximation the measurements can be said to be synchronised, and the unknown errors will not significantly reduce the accuracy of the system.

Alternatively a wired network may be used between the fixed receiving elements to distribute a timing pulse. This has the advantage of being less prone to interference, and potentially of lower cost.

At least three receivers must detect valid signals for the system to be able to calculate the position of the transmitter, but if all the receiving elements are coplanar, there can be ambiguity about whether a transmitter is above or below the plane containing the detector—eg the ceiling of a room. This ambiguity can be resolved if it is known for example that all transmitters are always below the ceiling.

The information gathered by this system can be used to automate computing and communications equipment in an intelligent manner. By locating the position of people and equipment for example in an office, hotel, hospital facility or home environment, it is possible for example to route phone calls, dispatch a printing job to the nearest printer, automatically identify the nearest visible screen to a user (for display or information requested by them), and intelligently select camera views in videophone conversations.

Availability of fine-grain high resolution location information can allow new methods of human-computer interaction, e.g. connection of video and audio streams by bringing their endpoints into close physical proximity.

It may also be possible to use a transmitting unit as an input device, e.g. as a wireless mouse, a 3D pointer, or for three-dimensional gesture generation.

It may also be possible to use the information gathered by the system to detect motion (by observing changes in the position of an object over time, or by Doppler methods), and the presence of opaque objects (which may shadow receiver elements), which can be deduced from patterns or reception of the distance measuring pulses.

DETAILED DESCRIPTION OF THE DRAWINGS

In FIG. 1, the position system operation is as follows:

1. To find the position of a mobile transmitting device 10, a PC 12 loads an 8-bit address of the mobile device onto its parallel port.
2. A transmitter controller, based around a Xilinx XC3020A FPGA (the FDGA configuration is shown FIG. 2) and interfaced to the PC parallel port, reads this address five times a second, and generates a 40 KHz data stream comprising a preamble and the address from the parallel bus of the PC.
3. The 40 KHz data stream is FM encoded onto a 418 MHz radio link by a Radiometrix BIM418 radio module 16.
4. As the first bit of the preamble is generated by the transmitter controller, a signal from that controller commands an ADC 13 (HP E1413/A) to begin sampling at a rate of 100 Kz (shared between all channels being sampled).
5. Mobile devices such as 10 described in detail in later Figures of the drawings located in the area covered by the system, pick up the preamble and 8-bit address and compare the address with their own. If the addresses match, the mobile device in question transmits a 750 microsecond pulse of 40 KHz ultrasound. Typically an array of five transducers is mounted on each device, typically in a hemispherical pattern (not shown).
6. The ultrasonic pulse is pocked up by one or more ultrasonic receiver units of which four are shown at 20, 22, 24 and 26. Those receiving the pulse process the signal in a manner described later before passing the processed signal to the ADC 18, which is set to sample them when instructed.

7. After the initial command to begin sampling, the ADC continues to sample at 100 KHz for 20 milliseconds and the sample values are stored. The stored sample values are passed over a serial interface to the PC 12. HP Vee software is loaded into the PC to manage the sampled data, find signal peaks, determine transmitter-receiver distances, and calculate and position relative to the receivers of the mobile device that was addressed, using the algorithms described herein before.

Figure 2B:
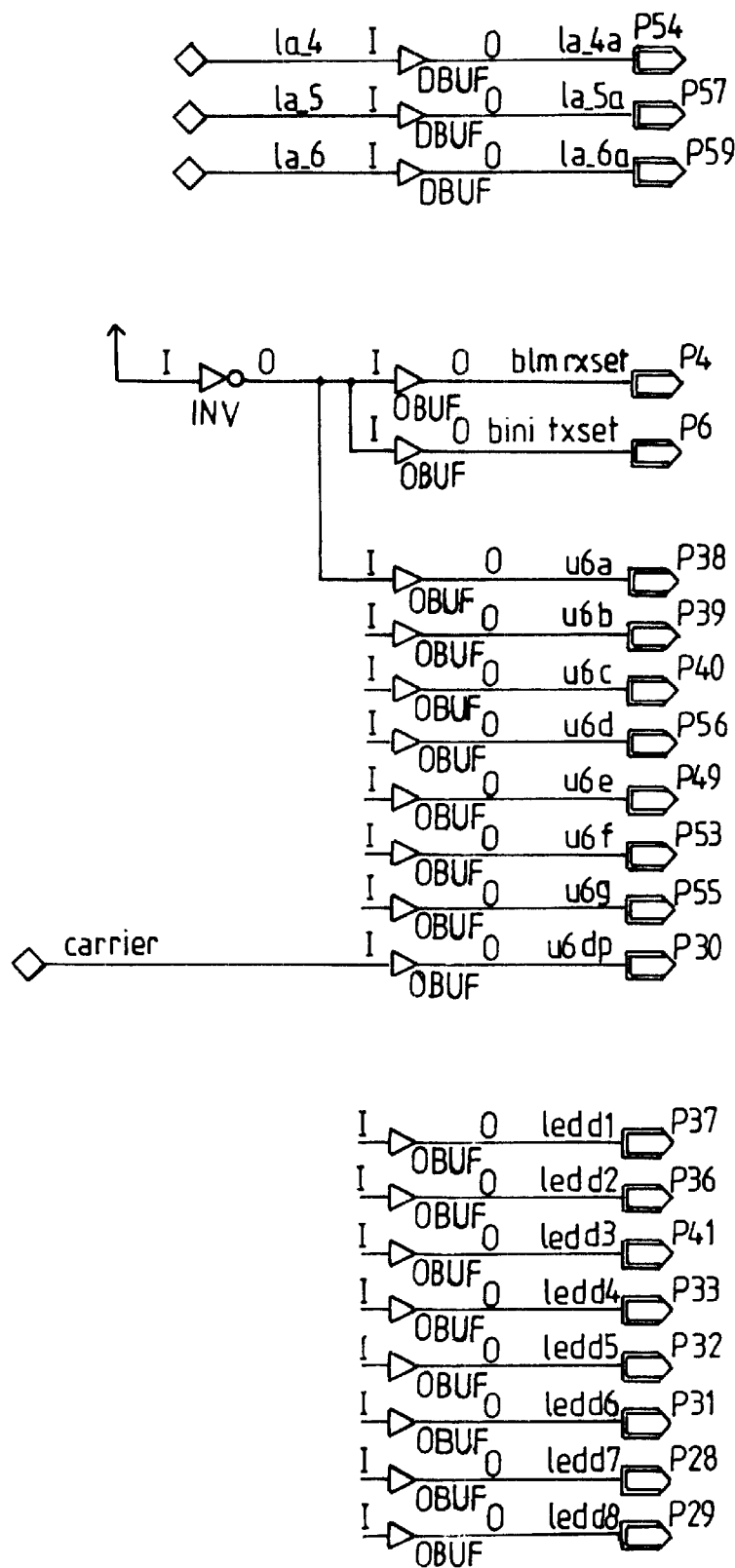
FIG. 2 shows the FPGA configuration of the transmitter unit.

The FPGA configuration of toe transmitter controller of FIG. 1 is detailed in FIG. 2.

Figure 3:
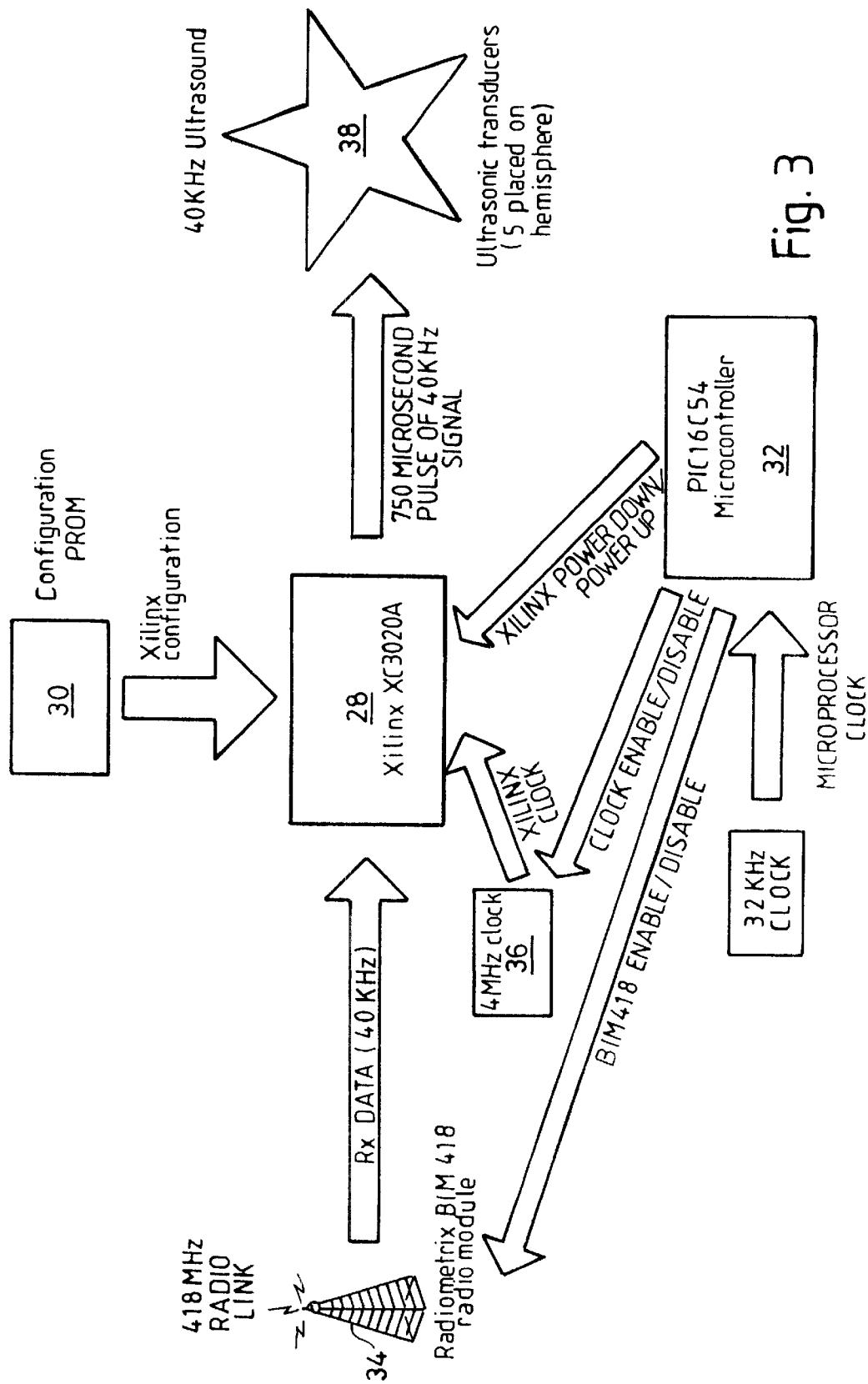
FIG. 3 is a schematic diagram of a mobile transmitter unit for the system of FIG. 1.
Figure 4A:
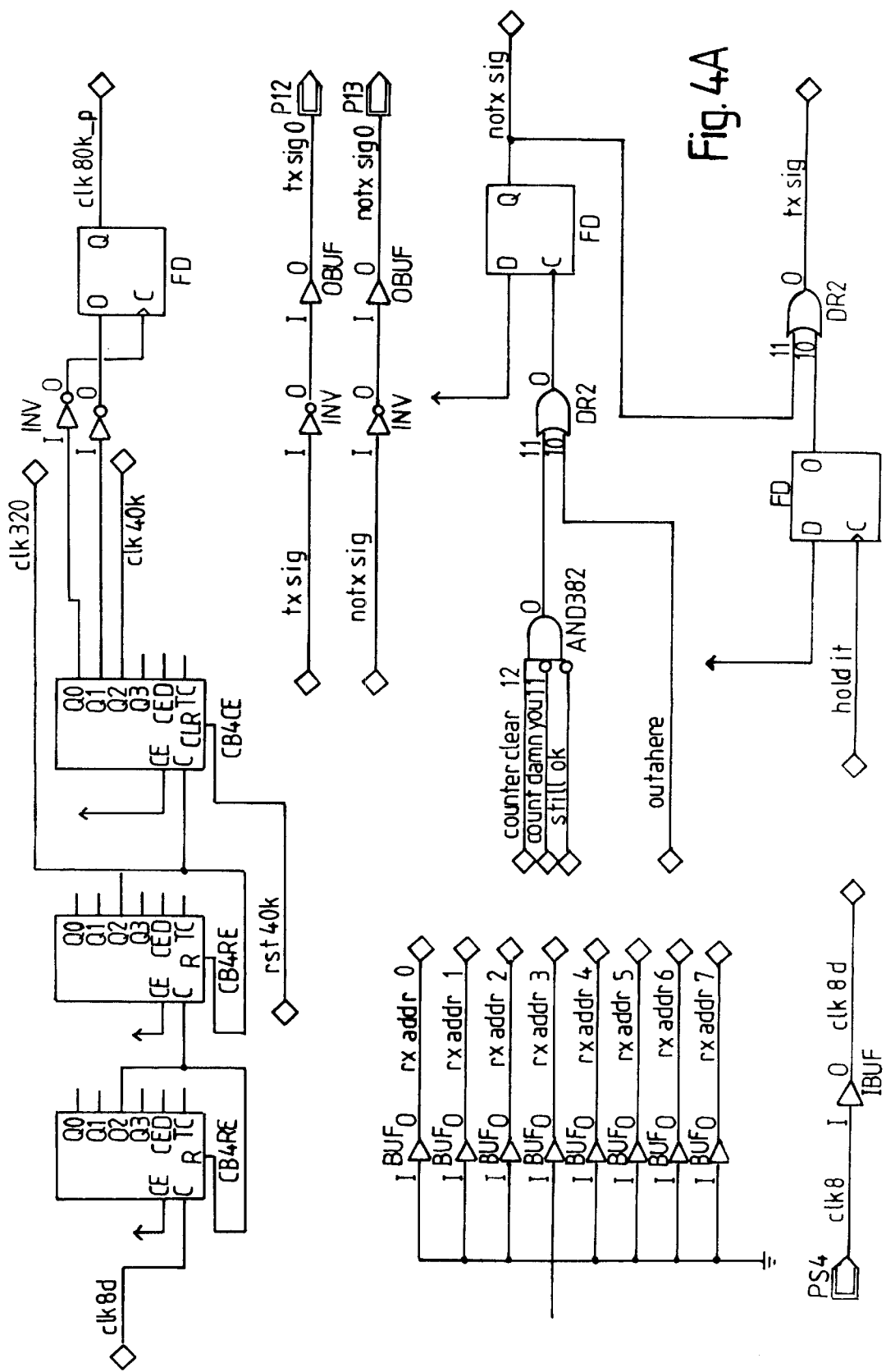
FIG. 4 shows the FPGA configuration of the mobile transmitter unit on the system of FIG. 3.
Figure 4B:
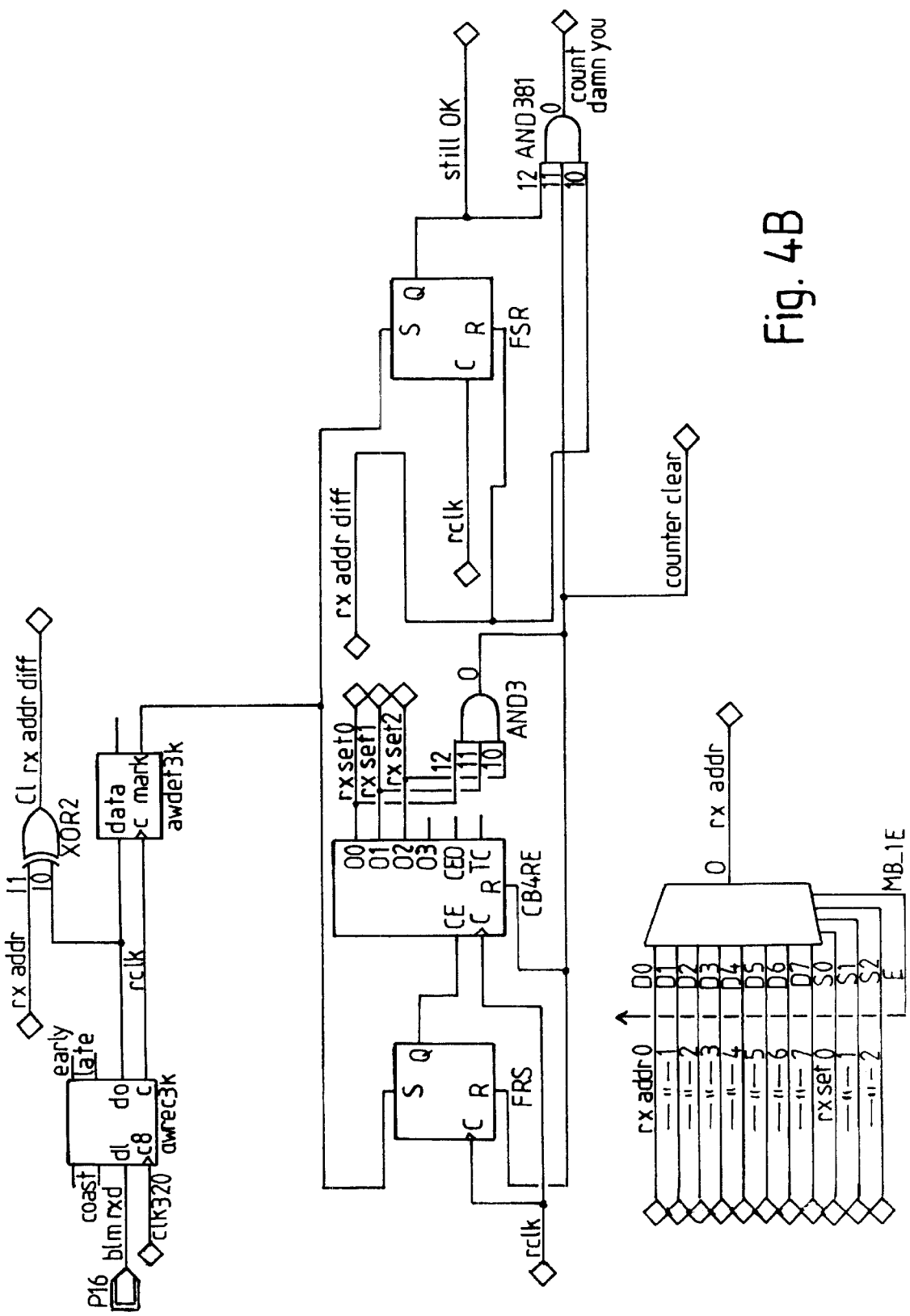
Figure 4C:
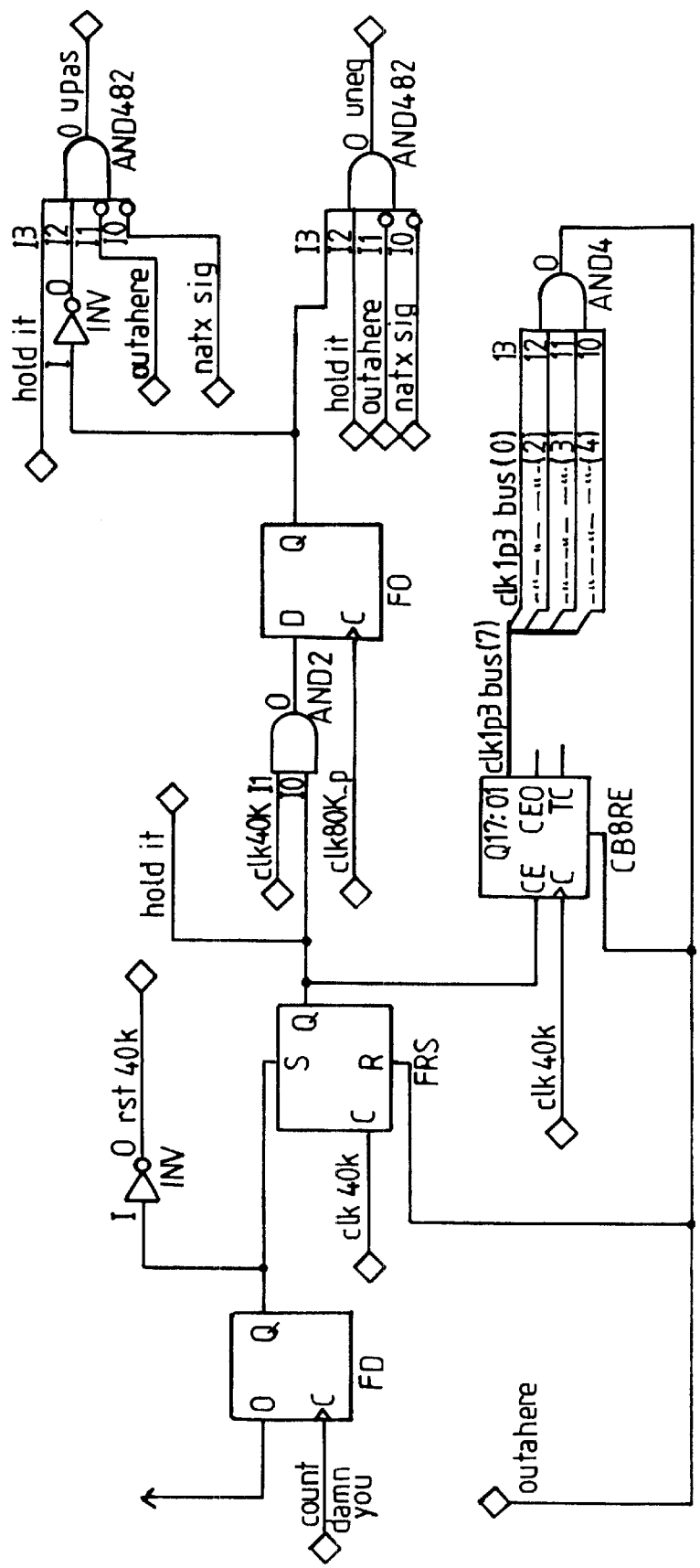

In FIG. 3 the operation of a mobile radio transmitter is as follows:

1. At power-up, the Xilinx XC3020A-FPGA unit 28 downloads its configuration from a Xilinx 1736PC serial PROM 30(the FPGA configuration is shown in FIG. 4). A PIC16C54 microcontroller 32 enables a Radiometrix BIM418 radio module 34 and a 4 MHz Xilinx clock 36 (built around a 4 MHz crystal and a 74HCT00 1C).

2. The XC3020A unit 28 monitors incoming 40 KHz received data until it detects a preamble and 8-bit address. It then compares the received address with its own (stored in its serial PROM), and if the addresses are identical it drives five ultrasonic transducers such as Famell Electronics part No. 213-214 at 40 KHz for 750 microseconds (of which one is shown at 38).

3. The PIC16C54 microprocessor 32 then disables the BIM418 radio module 34 and 4 MHz clock 36, and places he XC3020A unit 28 into powerdown mode, to save power, for 0.196 seconds. It then re-enables these components and step (2) is followed again.

Power is typically derived from two 3.6V half-AA lithium thionyl chloride batteries, regulated to 5V by an LT1129 IC.

The FPGA configuration of the transmitter controller of FIG. 3 is detailed in FIG. 4.

Figure 5:
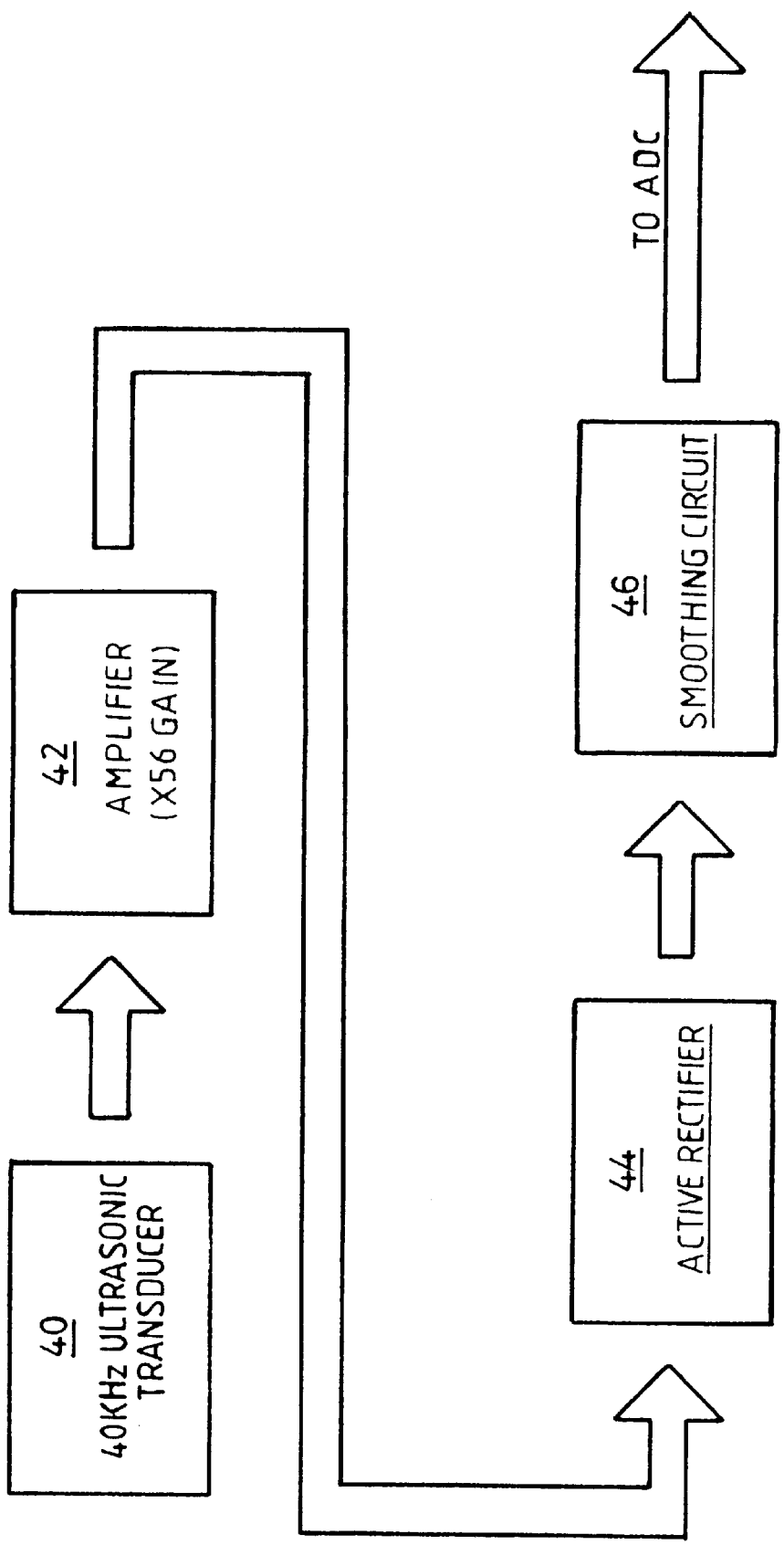
FIG. 5 is a simplified block schematic of the ultrasonic receiver unit.

The operation of the ultrasonic receiver shown in FIG. 5 is as follows:

1. The ultrasonic signal is detected by an ultrasonic transducer such as a Farnell Electronics part No. 213-226 denoted by 40.

2. This signal is amplified (typically by a factor of 56) using an inverting amplifier 42. Typically this is built around one-quarter of a TL074 quad op-amp.

3. The amplified signal is rectified using a full wave active rectifier 44. Typically this is built around one-half of a TL074 quad op-amp.

4. The rectified, amplified signal is smoothed using an RC circuit 46 to obtain a signal which represents the envelope of a rectified version of the original signal.

5. This signal is passed to the HP E1413/A ADC 18 (see FIG. 1) via an RJ45 jack plug and one wire of a four wire network, which also supplies the unit with +5V, −5V and GND power lines.

Standard Receiver

A number of these are located at known locations around the environment (room) in the ultrasonic positioning system.

Figure 6A:
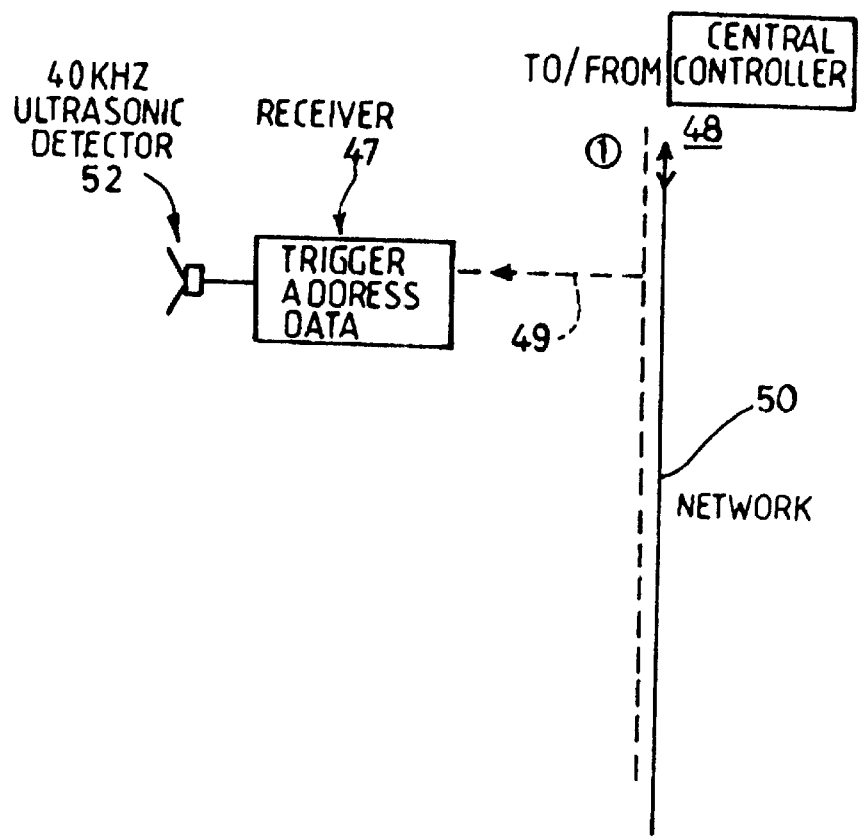
FIGS. 6A to 6C show how a standard ultrasonic receiver, such as shown in FIG. 5, operates as part of a transponder in the system of FIG. 1.
Figure 6B:
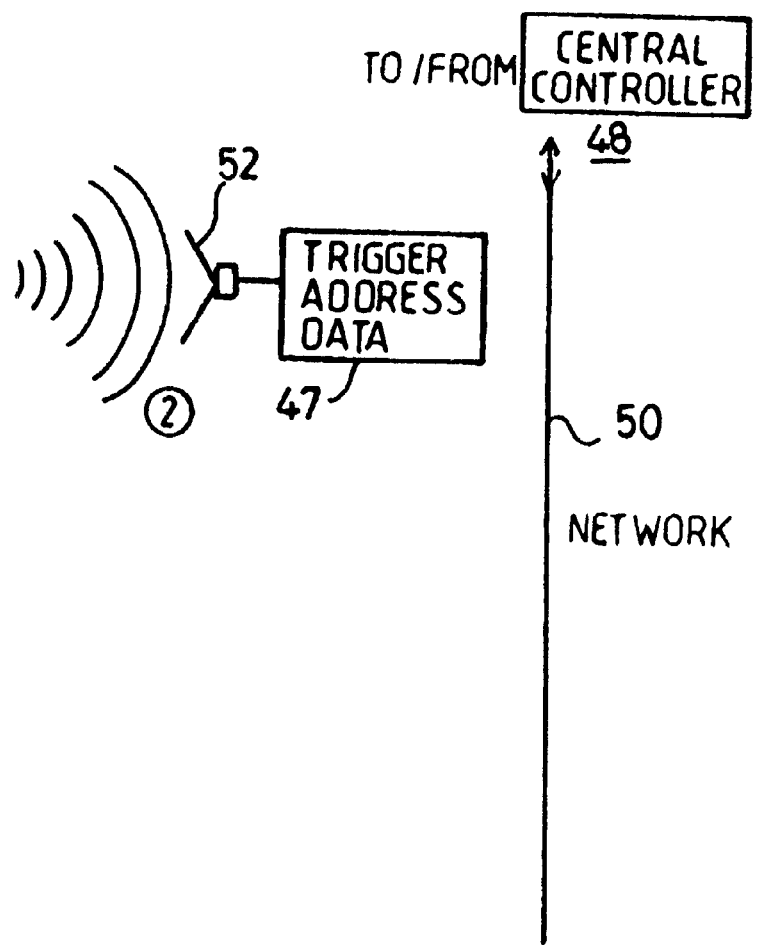
Figure 6C:
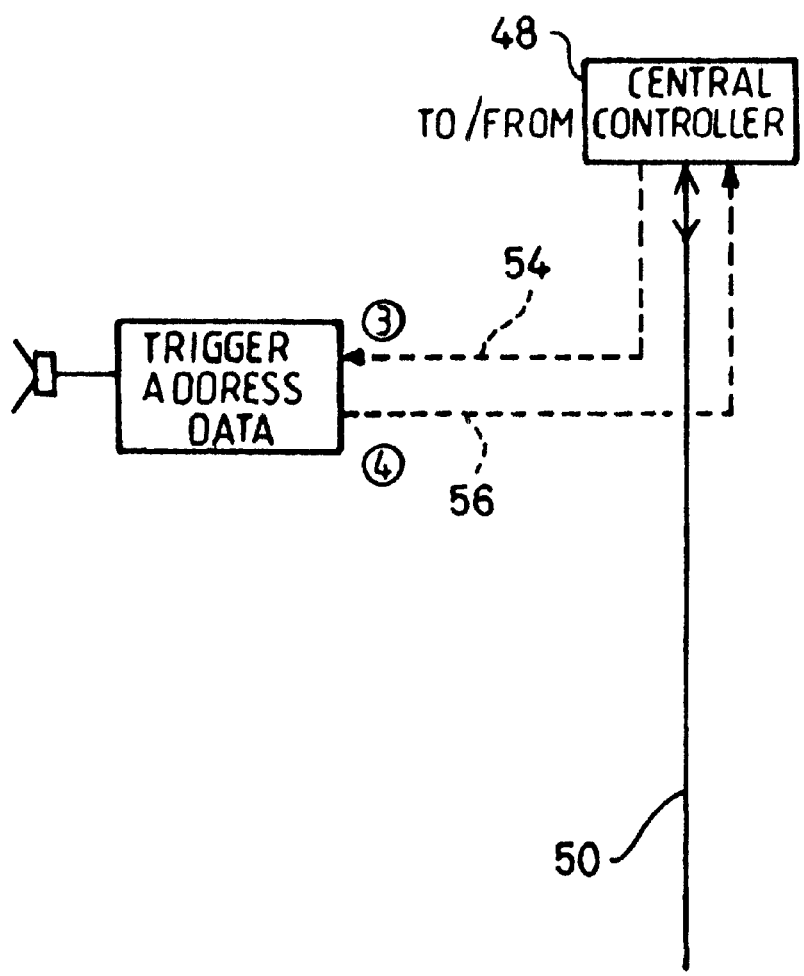

As shown in FIG. 6(A), each receiver 47 is triggered by a central controller 48 across a network 50. Following a timing or reset signal 49, the receiver monitors signals from a 40 KHz ultrasonic detector 52 for 20 ms as depicted in FIG. 6(B), and the time at which the incoming signal peaked for the first time is determined and held in the receiver. After the 20 ms window closes, the central controler 48 polls each receiver across the network 50 as depicted at 54 and 56 in FIG. 6(C), and retrieves the time value. The value from each receiver is either the time after the window opened at which the signal first peaked, or is zero (which indicates that no useful signal was detected).

Reducing System Response to Spurious Acoustic Signals

Figure 7A:
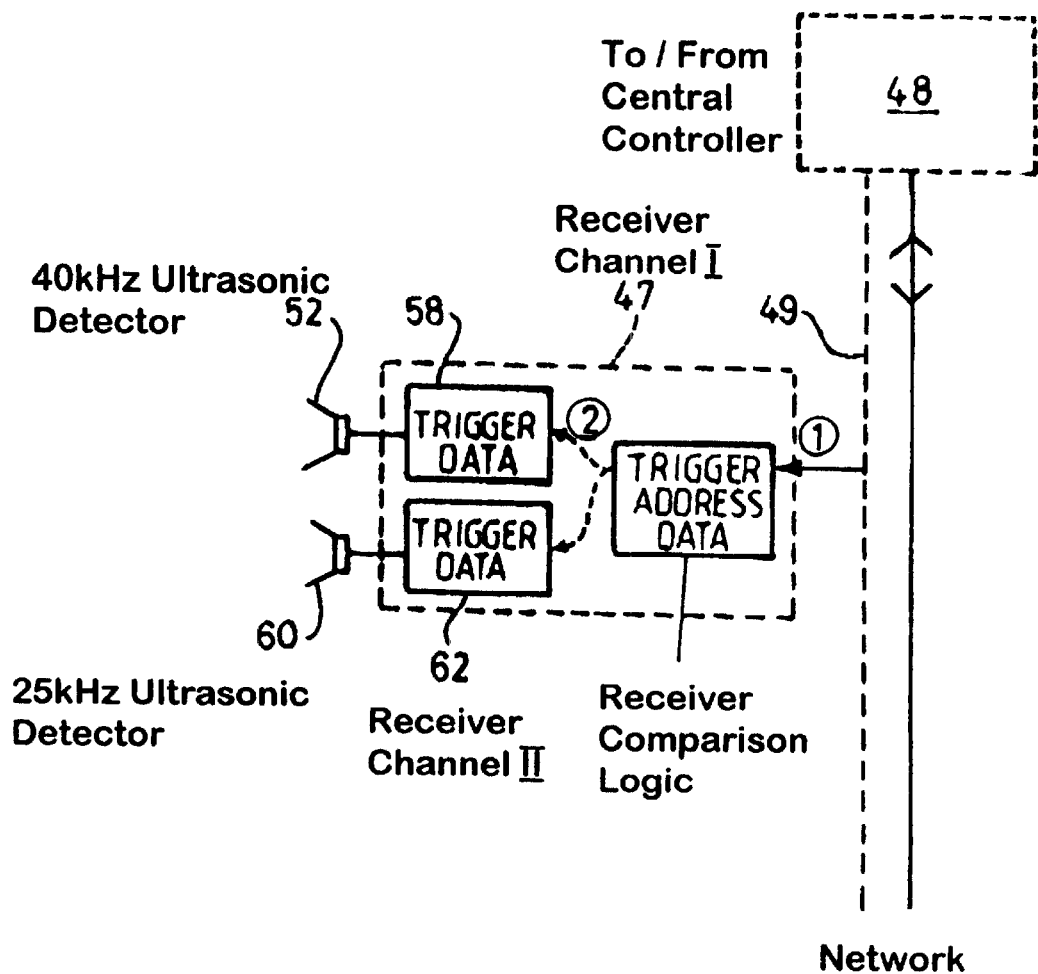
FIG. 7A to 7D show the operation of a modified ultrasound receiver, adapted to render it insensitive to spurious noise signals, in the system of FIG. 1.

To confer noise immunity two channels and two ultrasonic detectors are provided as shown in FIG. 7A. The first detector 52, and first channel 58 are sensitive to 40 kHz and the second, 60, 62 to another frequency eg 25 kHz.

Figure 7B:
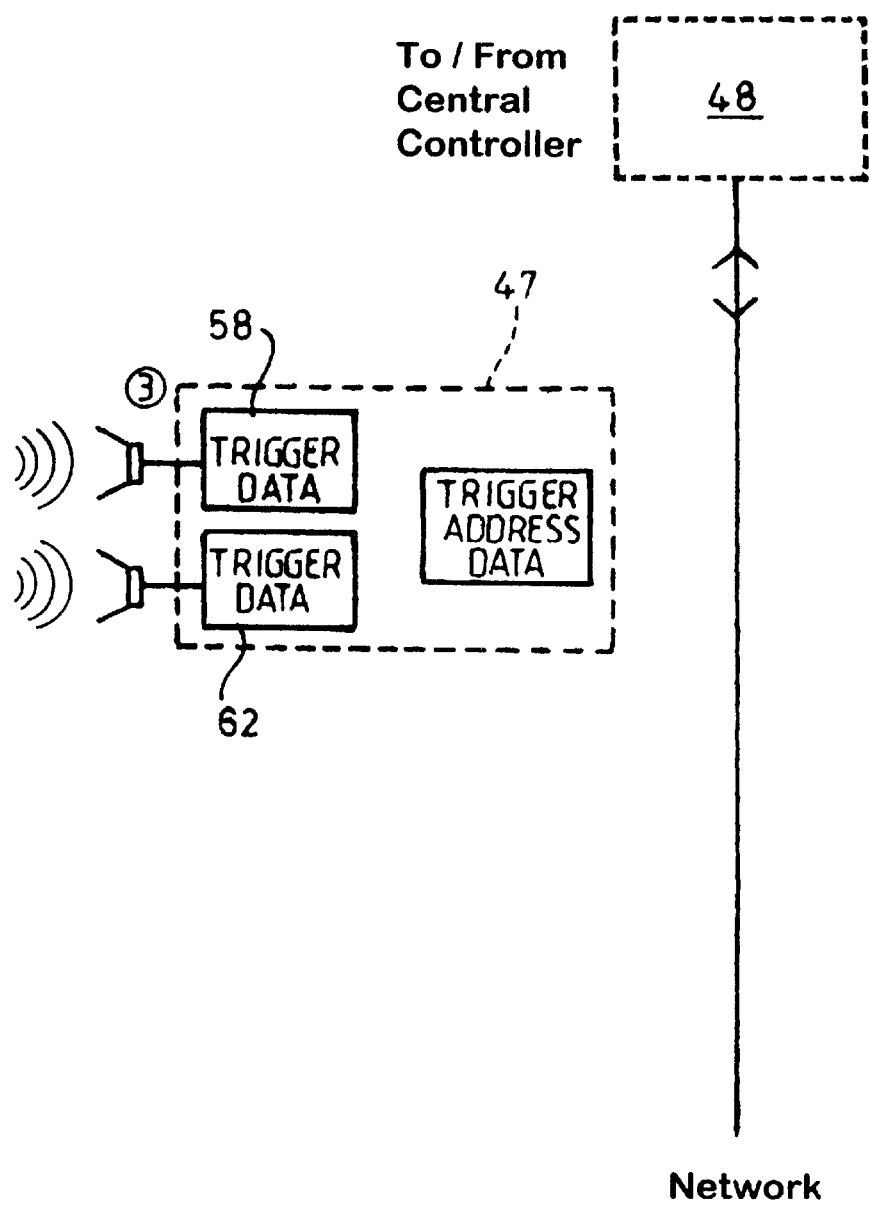

When the receiver is triggered, both channels are reset and monitor the incoming signals for 20 ms, and determine the times (a,b) at which any received signals peak for the first time as shown in FIG. 7(B)

Figure 7C:
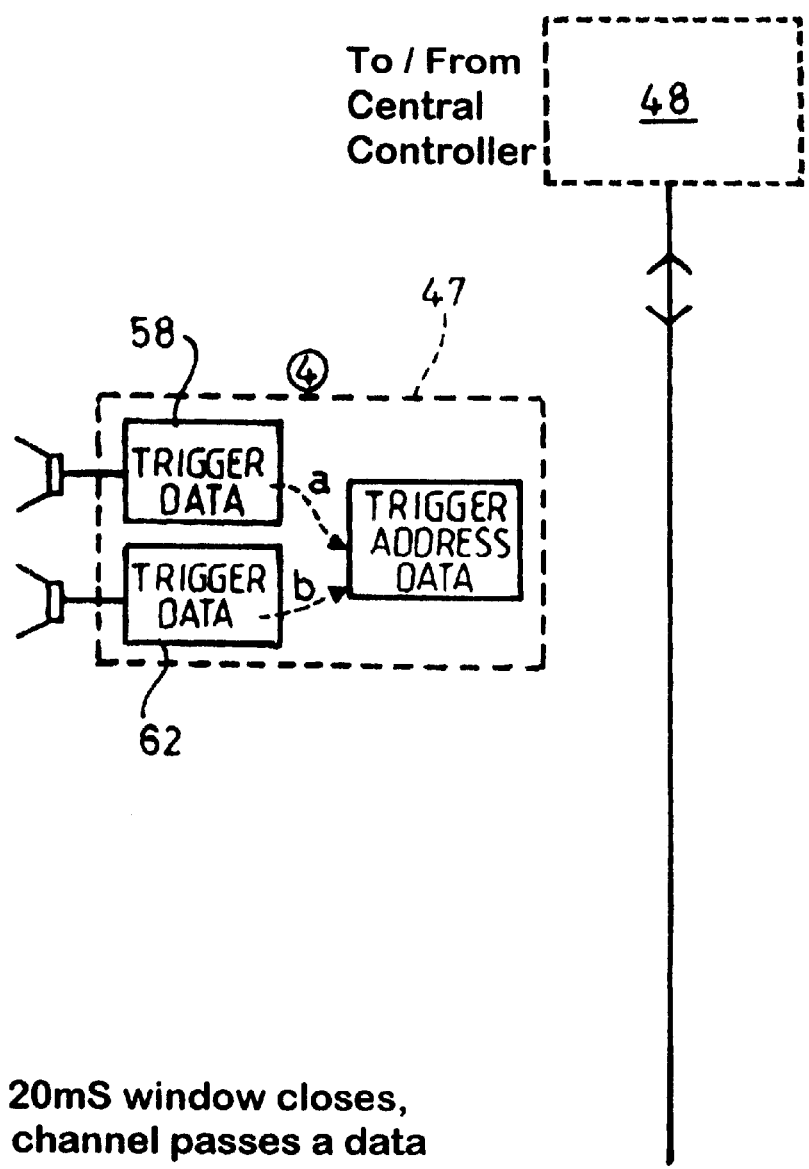

The value b is checked and if greater than 0, the value of a is forced to 0, also, as shown in FIG. 7(C). If b equals 0, the value of a is available to be returned to the central controller.

Figure 7D:
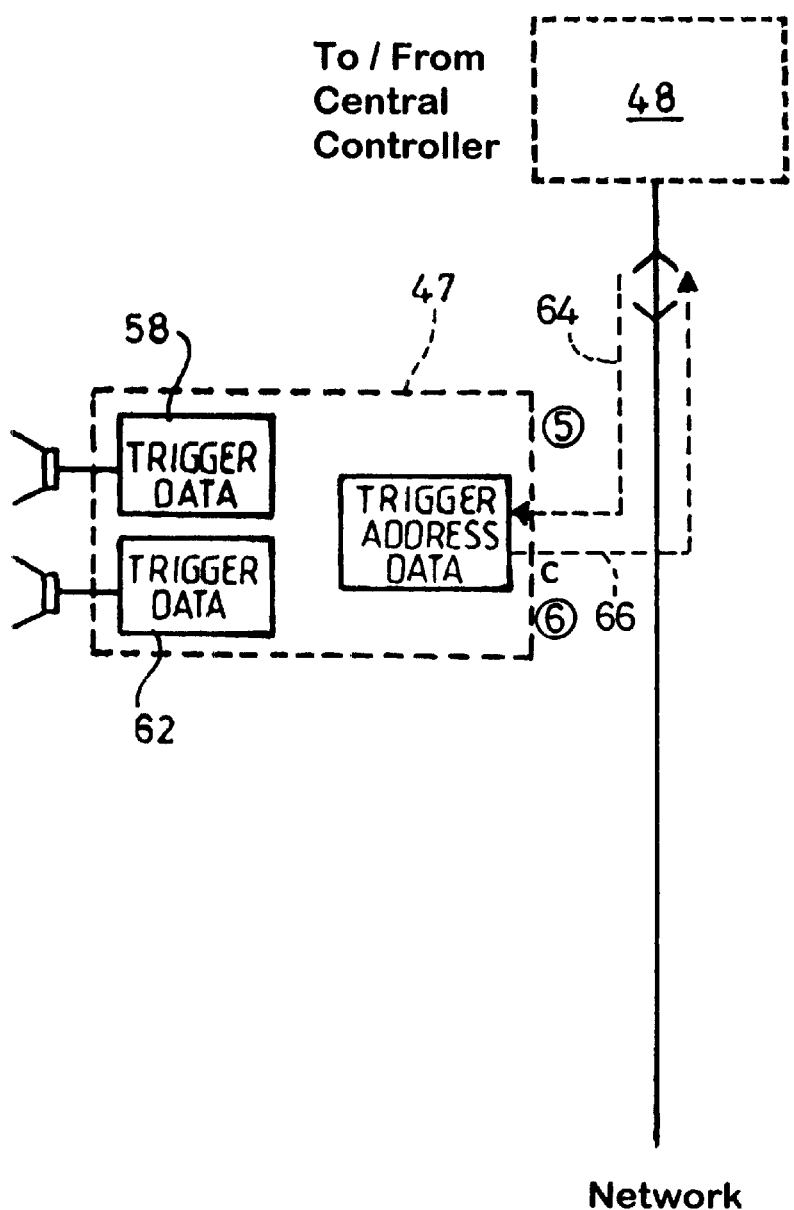

When the central controller 48 polls each receiver 47 across the network is shown in FIG. 7(D), and nosed by 64, the time value a from the first channel 52, 58 is returned to the controller 48, as denoted by 66. If the second channel value b had been non-zero (indicating that a spurious acoustic signal was detected), then zero is returned to the controller from the first channel 52, 58.

Transponder Design

Figure 8:
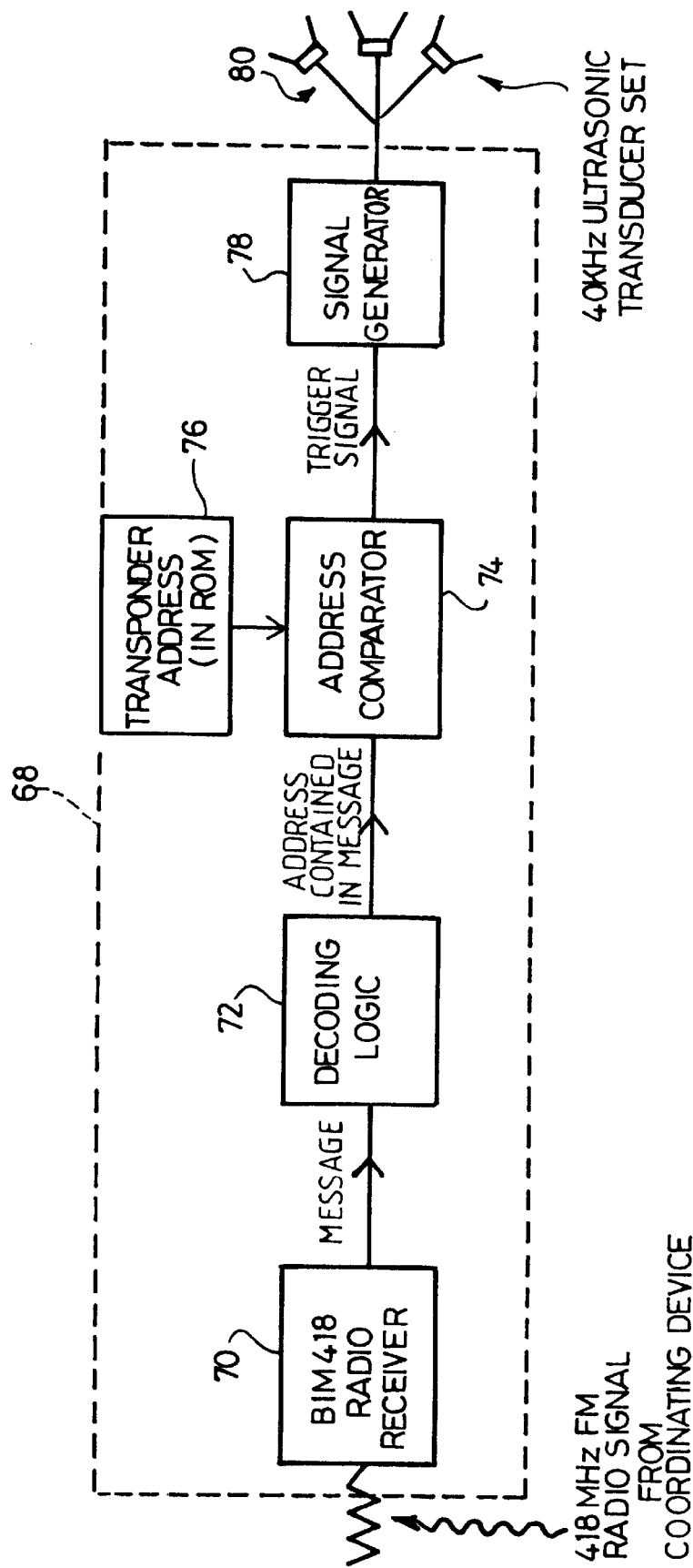
FIG. 8 is a more details block schematic diagram of the ultrasound receiver such as shown in FIG. 5.

A standard receiver-transmitter (transponder unit 68 (such as item 10 in FIG. 1) is shown in FIG. 8.

This comprises a radio receiver (1) which picks up encoded FM signals in the 418 MHz band from a radio transmitter (16 in FIG. 1) controlled by a central coordinating device 48 (not shown).

These signals are passed through decoding logic 72, which presents the address contained in any decoded message, to an address comparator 74. If the latter identifies the address in the message as that or the transponder stored in ROM 76, it triggers a signal generator 78, which drives a set of ultrasonic transducers 80 to transmit an ultrasonic pulse.

Figure 9:
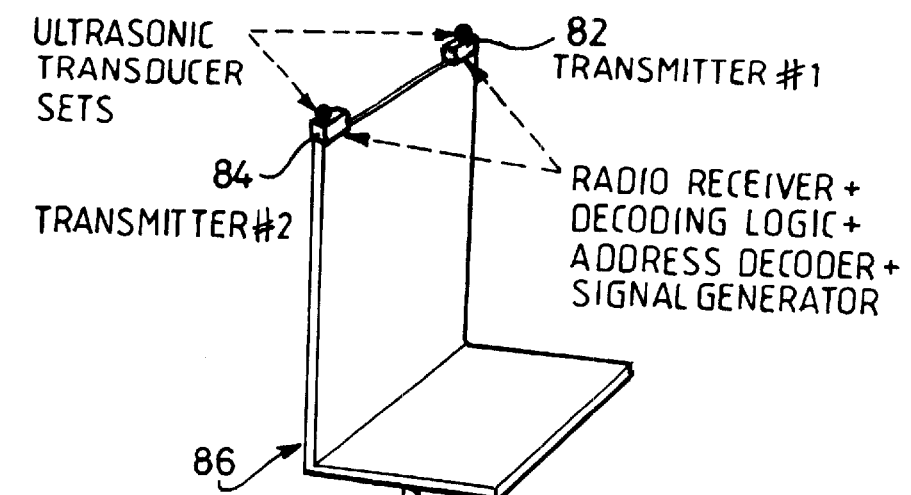
FIG. 9 shows how two transponders each incorporating standard ultrasound receivers can be mounted on a movable object such as a chair to indicate rotational movement.
Figure 10:
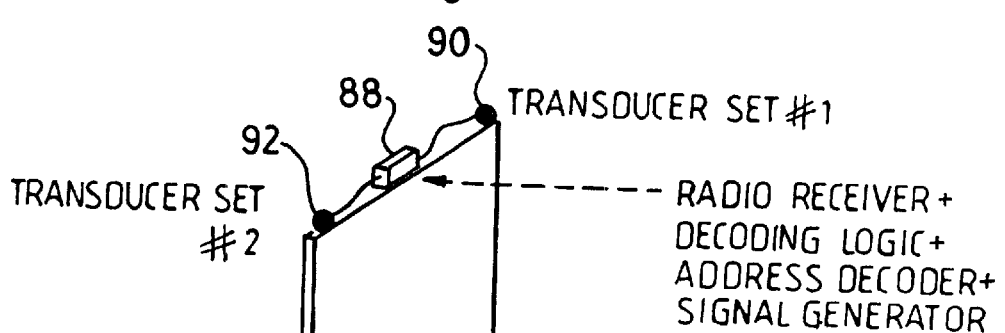
FIG. 10 shows how component redundancy in a two transponder arrangement such as shown in FIG. 9, can be reduced.

Two such standard transponders 82, 84 are shown in FIG. 9 attached to two spaced apart points on a chair 86. Since the two transponders 82, 84 contain similar duplicated components, an alternative arrangement is possible as shown in FIG. 10. Here, a single receiver and control unit 88 drives two individually addressable ultrasonic transducer sets, mounted at the same points on the chair 86, 90, 92 as were the standard transponders 82, 84.

Figure 11:
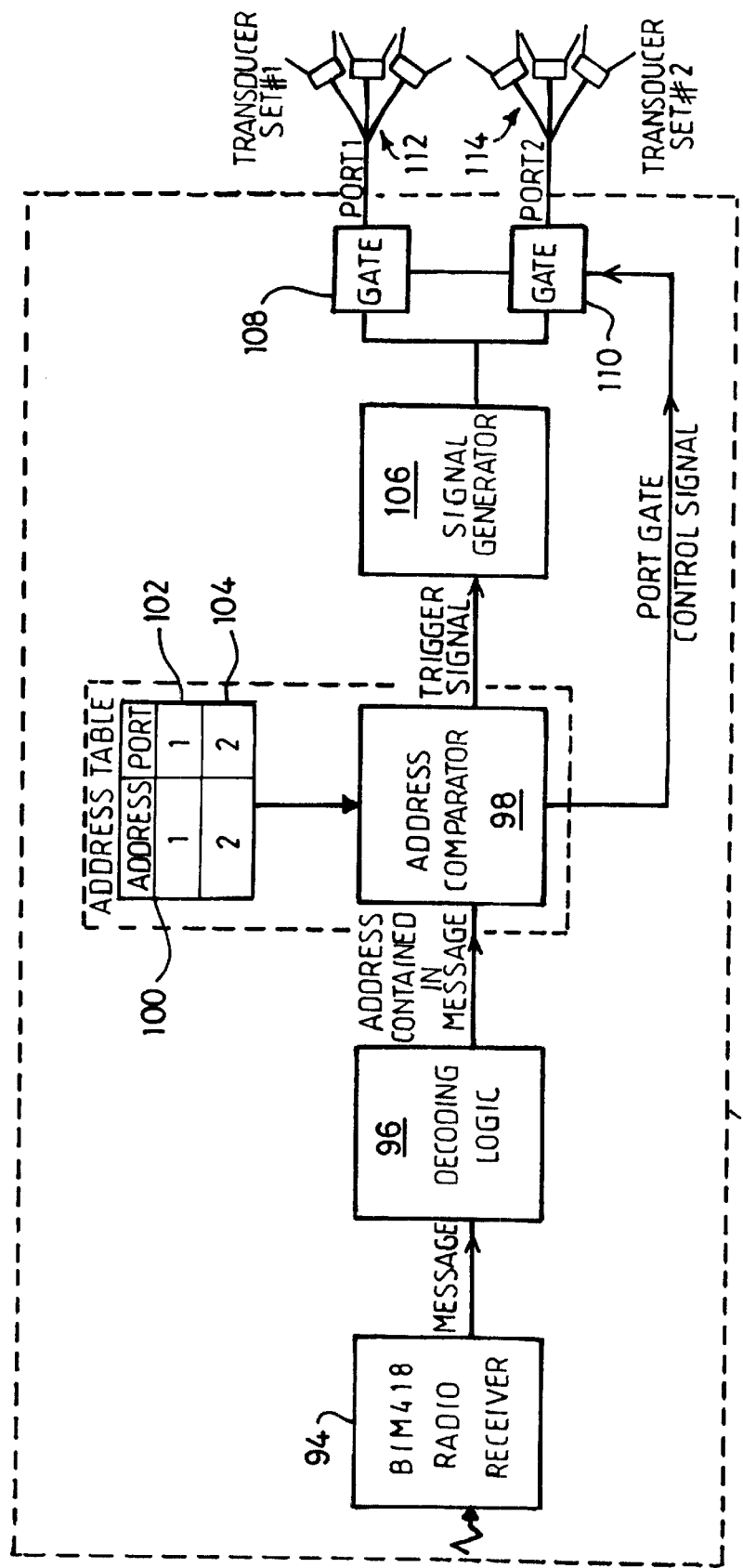
FIG. 11 is a detailed block schematic of the single more complex receiver unit provided in the system of FIG. 10.

The alternative arrangement is shown in more detail in FIG. 11. The unit 88 is made up of a radio receiver 94 which picks up the encoded FM signals in the 418 MHz band from the central transmitter. These signals are passed through decoding logic 96, which presents the address contained in any message detected to an address comparator 98. The latter is associated with a lock-up table 100 containing in this case two rows 102, 104. Each row stores a transducer address and a port number (e.g. if transducer set 1 is attached to port 1, one of the rows will be the ordered pair (1,1)).

If the address comparator identifies that the address in a received radio message matches one of the transducer addresses in the look-up table 100 it triggers a signal generator 106. The address comparator also controls gates 108, 110, to direct the output of the signal generator 106 to the port identified by the port number in the received transducer address. It can be seen therefore that the number of radio receivers, decoders, comparators and signal generators required by a system where two or more ultrasonic transmitter transducers are to be mounted as single objects, can be reduced, with consequent economies.

Two groups of ultrasonic transducers 112, 114 are connected separately one to port 1 (controlled by gate 108) and the other to port 2 controlled by gate 110.

Introducing Directionality into the Transducers

Figure 12A:
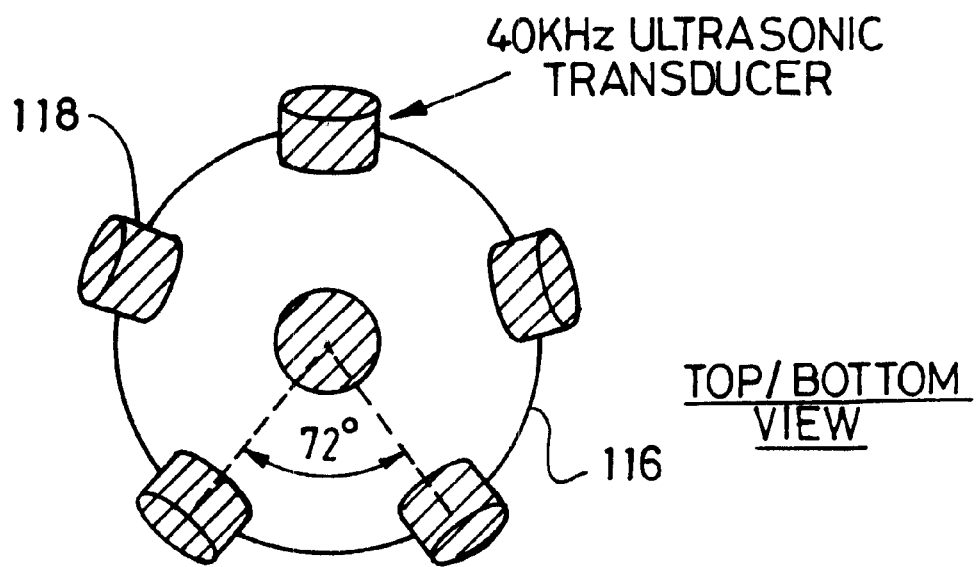
FIGS. 12A and 12B are top (or bottom) and side view of an omnidirectional ultrasound source.
Figure 12B:
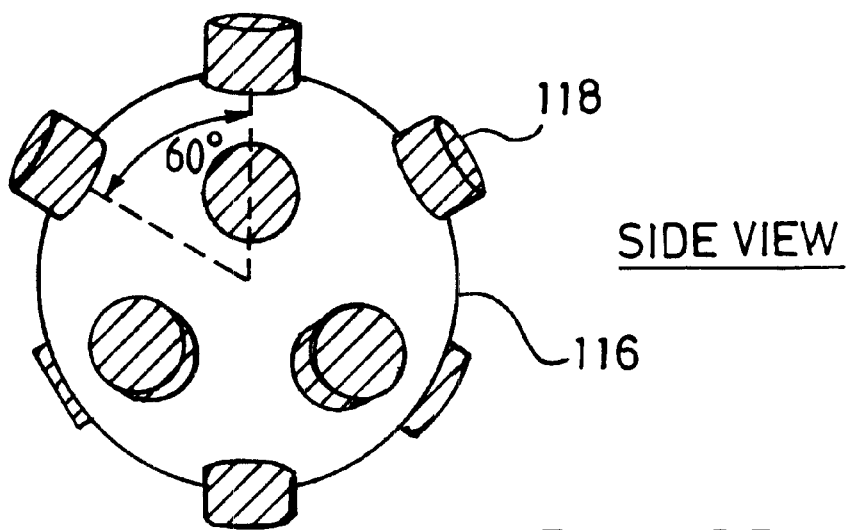

Since ultrasonic transducers tend to produce a sound wave over a relatively small solid angle, and they are therefore rather directional. A less directional transducer is shown in FIGS. 12A and 12B. This comprises a spherical body 116 from which protrude a plurality of regularly spaced transducers, one of which is shown at 118 in each of the views.

Figure 13:
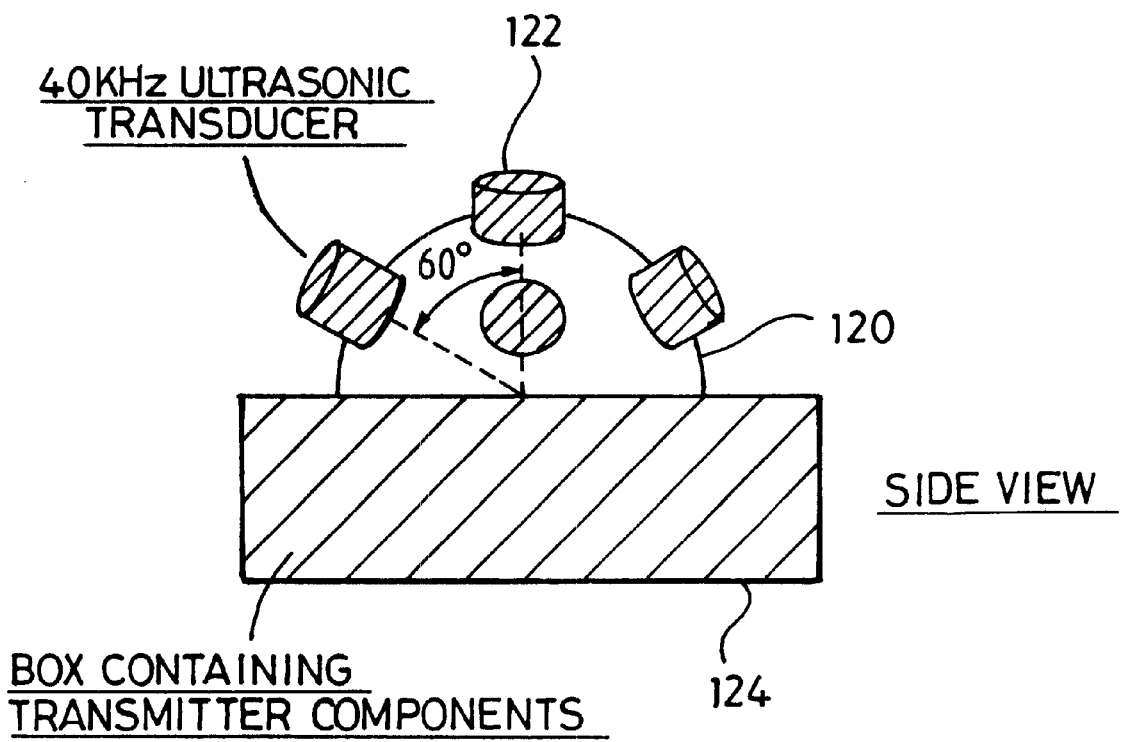
FIG. 13 illustrates a more directional ultrasound source.

If the spherical unit 116 or FIGS. 12A and 12B is mounted so that its lower half is acoustically shielded, none of the lower transducers serves any useful purpose and could be omitted. Such a unit is shown in FIG. 13(C), where the hemispherical body 120 carries transducers 122.

The device 120 is shown mounted on a housing 124 which may contain electronic components making up the transponder. Less than half the number of transducers are required than in an omnidirectional source such as shown in FIGS. 12A, 12B.

Figure 14A:
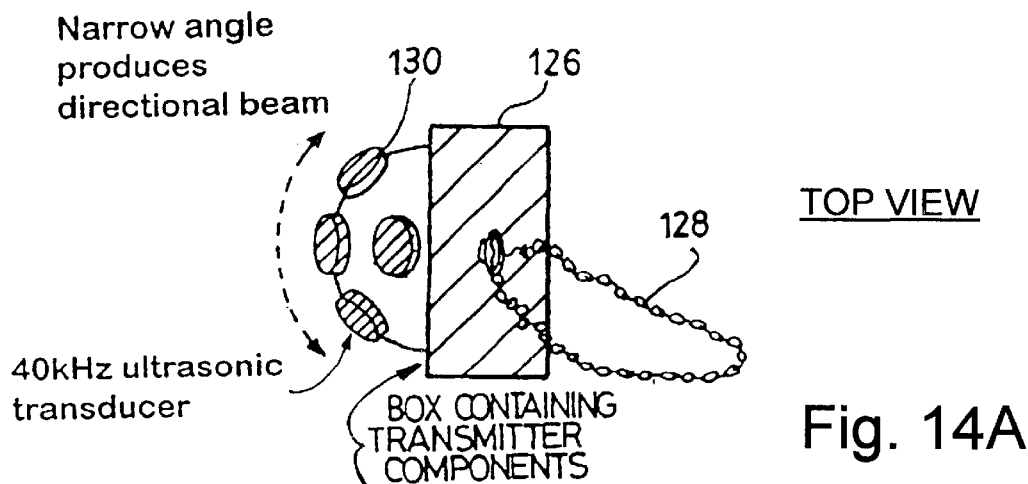
FIGS. 14A and 14B are top and side views of a transponder unit designed to be worn round the neck.
Figure 14B:
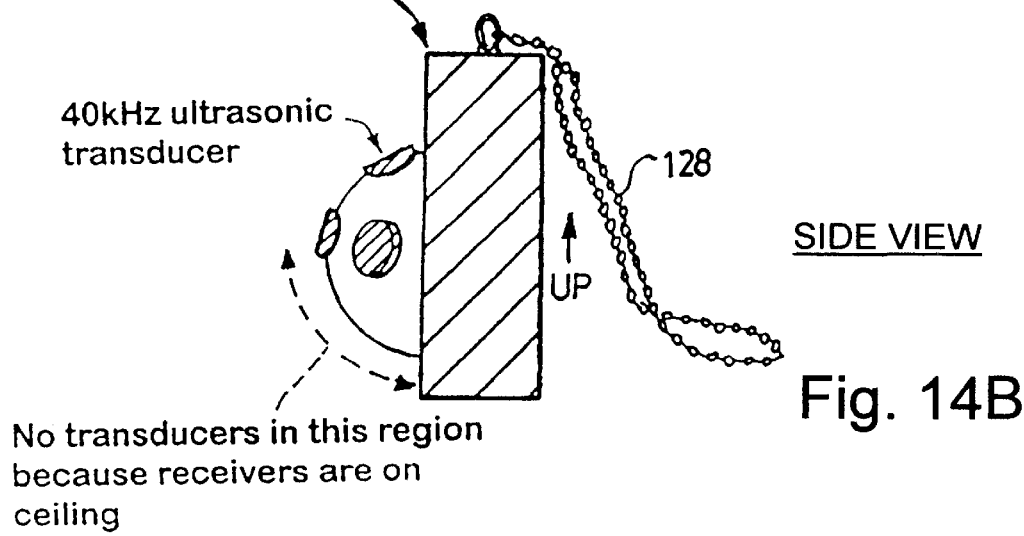
Figure 14C:
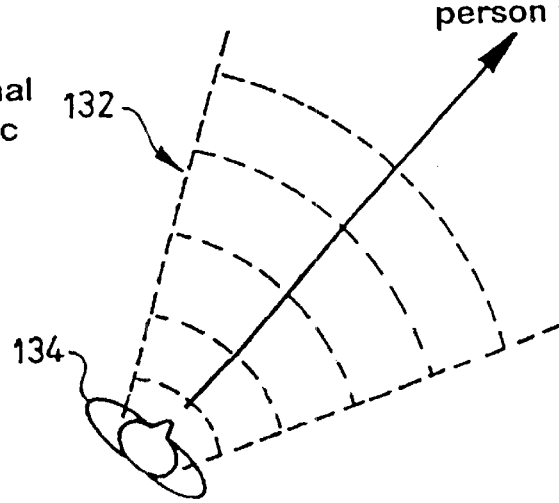
FIG. 14C is a view from above showing the directionality of the device shown in FIGS. 14A and 14B.

FIG. 14A shows a transponder 126 capable of being worn by a person around their neck for example on a chain 128. As seen in FIG. 14C, the ultrasonic transducers 130 can be arranged to give a relatively narrow beam 132 which will project in front of the person 134. By finding the position of the person 134 and the locations of the receivers (20, 22, 24 etc in FIG. 1) at which the beam is detected, it is possible to deduce which way the person is facing.

Figure 15:
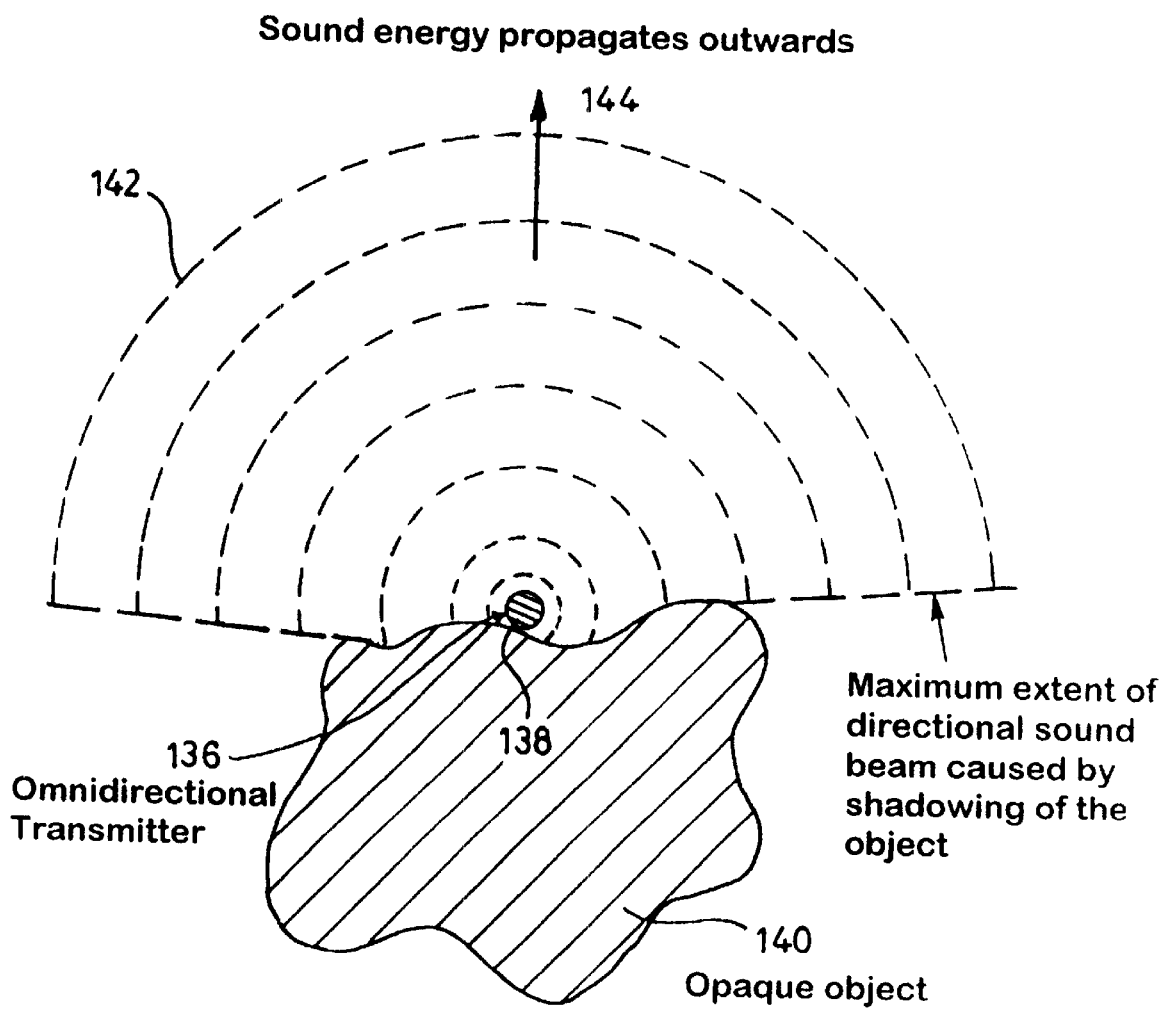
FIG. 15 is a view from above of the sound pattern which emanates from an omnidirectional ultrasound transducer (or transducer group) when attached to or partly obscured by an object which is of acoustically opaque and/or absorbing material.

Derivation of Orientation Information

Where the objects on which transponders omnidirectional (standard) are attached are opaque or relatively opaque to ultrasound, it is possible to obtain information about the orientation of those objects from the data collected by the receivers such as 20, 22 etc in FIG. 1. Consider a transponder 136 attached to a known point 138 on such an object 140, as in FIG. 15. The capacity of the object 140 ensures that the only sound energy 142 which can leave its vicinity does so in the direction 144. This effect may be amplified if the transmitter is itself directional to some degree.

By interrogating the receivers (20, 22 etc (FIG. 17)) in an environment containing such an object and performing a calculation on the information they provide, the location system can calculate in three dimensions the position (x,y,z) of the transponder 136. The location system also knows the positions $(u_1,v_1,w_1) \ldots (u_n,v_n,w_n)$ of the n receivers that have detected the ultrasonic signal. Using the known location of the transponder on the object and the known locations of the receivers, the direction, relative to the object, in which the ultrasonic energy will have left its vicinity, can be deduced. Correlating these three items of information allows the object's orientation to be determined, where the position of point 138 relative to the object 140 is known.

Figure 16:
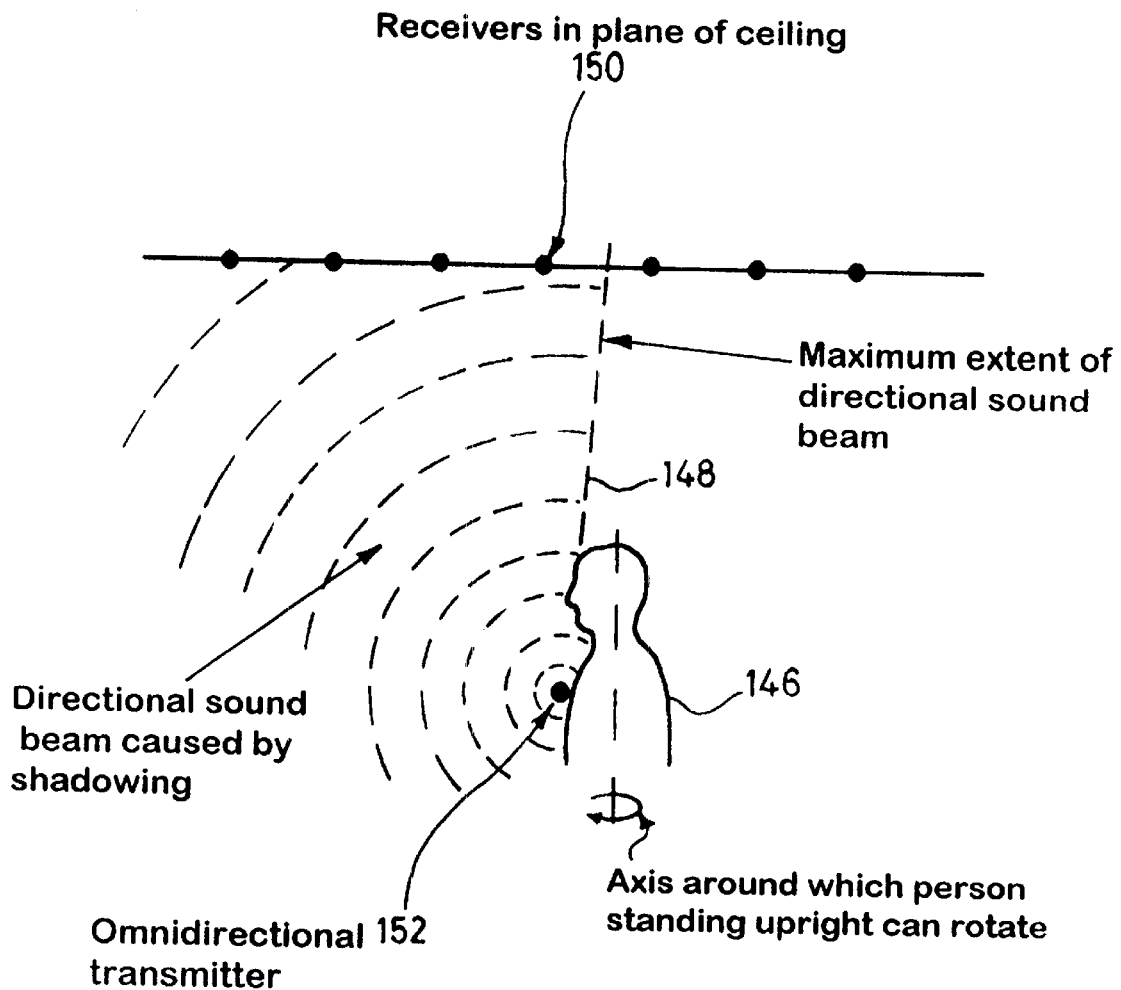
FIG. 16 is a side view of a person wearing a device such as shown in FIGS. 14A and 14B.
Figure 17:
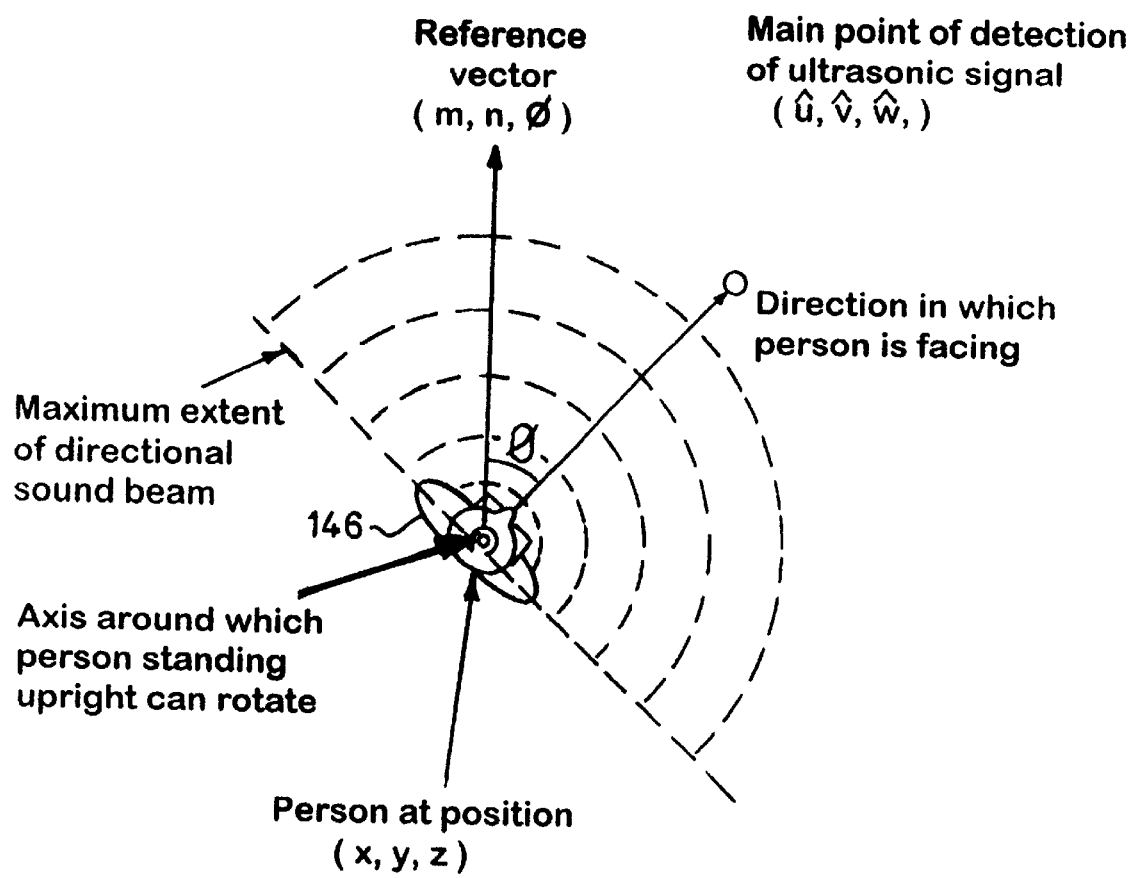
FIG. 17 is a top view of the person shown in FIG. 16.

An example of how this can be derived will be described with reference to FIGS. 16 and 17 which show a standing person 146, who can face in any direction and therefore be said to be rotatable about a vertical axis 148, relative to a horizontal array of receivers one of which is denoted by 150.

Figure 18:
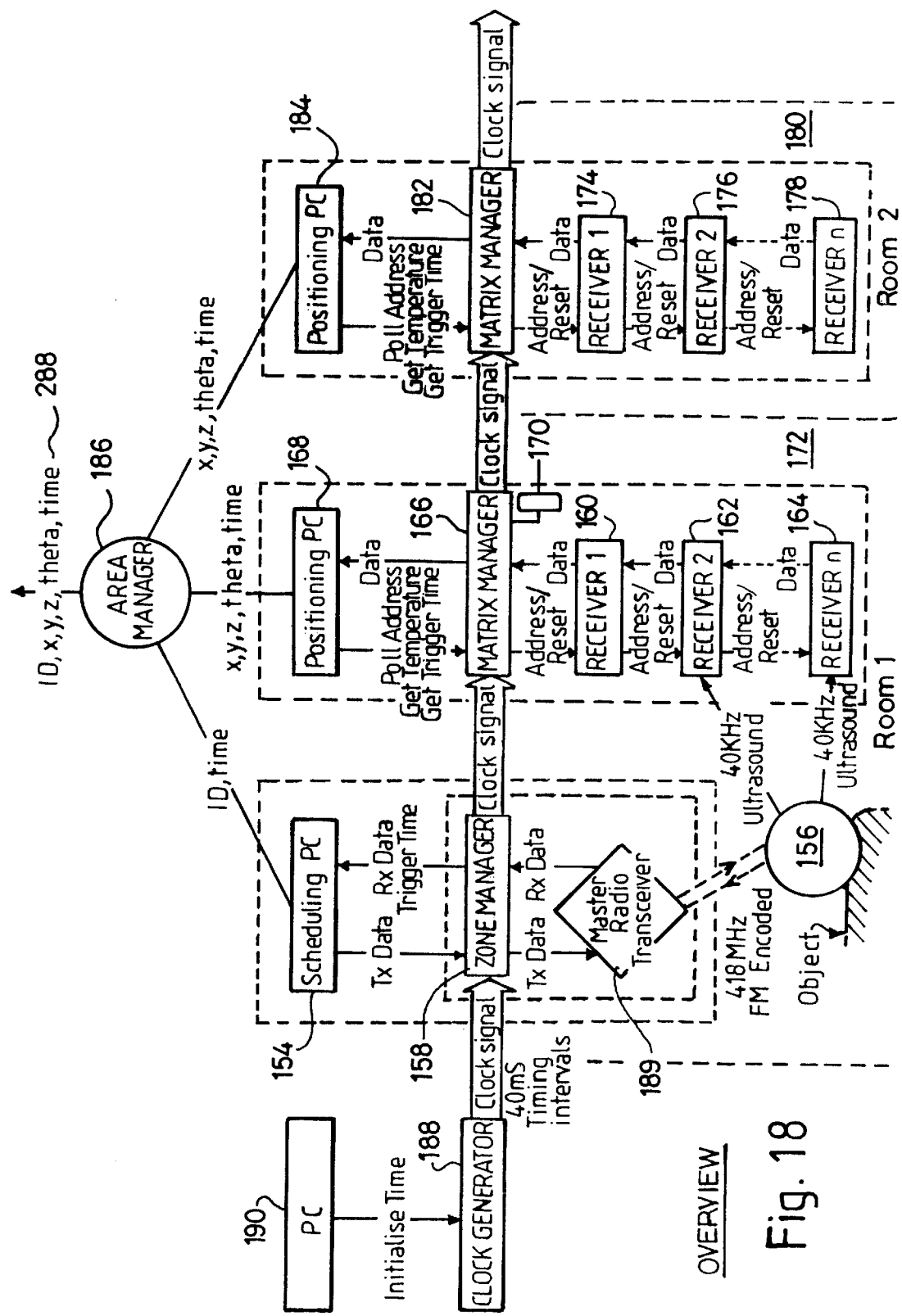
FIG. 18 is a block schematic overview of a complete system incorporating the invention and also including bi-directional radio link between the master transmitter unit and each of the addressed transponders.

The person 146 is wearing a transponder 152 on a chain around his neck. In this case, the sound energy is directed in front of the person, with the middle of the beam lying in the same vertical plane as the direction in which they are facing. FIG. 18 shows the person from above and the area in the horizontal plane over which sound energy will be radiated from the ultrasonic transducers on the transponder 152.

First it is necessary to compute the mean point of detection of the ultrasonic signal or the ceiling (û,v,w), given by Equations (5), (6) and (7).

Secondly, the vector (a, b, c) is computed from the transponder to the mean point. The vector a, b, c, is computed using Equations (8), (9) and (10).

The vector (a,b,0) usually can be taken to be a good estimate of the horizontal direction, of the middle of the sound beam leaving the object's vicinity, and can be used to calculate the direction A, in which the person is orientated around a vertical axis (relative to some other horizontal direction specified by a vector (m,n,0).

The value of A in the range $[-\pi, \pi]$ can be computed from the values of sinA and cosA given by Equations (11) and (12).

The value of A can be used as an estimate of the direction in which the person is facing.

FIGS. 18 to 23 illustrate a position detection system embodying the invention and the separate parts making up the system.

Complete System

FIG. 18 is a block schematic diagram of the complete system in which a Scheduling PC 154 dictates which one of a set of Mobile Transponders (one of which is shown at 156) are to be addressed in each of 25 timeslots per second. Addressing messages generated by the Scheduling PC are sent to Mobile Transponders via a Zone Manager 158, which also passes registration messages from the Mobile Transponders 156 back to the Scheduling PC.

Ultrasonic signals generated by the addressed Mobile Transponders 156 in response to the addressing messages sent by the Zone Manager, are detected by a set of Receivers three of which are shown at 160, 162, 164 attached to a Matrix Manager 166. Typically, there will be one Matrix Manager and a set of Receivers per room (or other space in which ultrasound is confined).

A Positioning PC 168 connected to the Matrix Manager 166 derives the air temperature of the room in which the polled receivers are located via a thermometer 170, and polls the Receivers 160, 162 etc to retrieve the three measurements derived from the received ultrasonic signals, and uses this data, and the measurement of air temperature in the room 172, to calculate the 3D position of the source or the ultrasonic signals.

A second set of receivers (174, 176, 178) in a second rom 180 are also shown, with associated matrix manager 182 and positioning PC 184. Other similar set-ups can be provided for each room in a building, each linked to a central area manager 186.

Information from the Scheduling PC and the Positioning PCs is collated by an Area Manager 186, which produces a stream of location events that may be sent to users or applications. In order to perform this collation, elements of the system must be synchronised—this is achieved using a 25 Hz signal from a Clock Generator 188 and initialising PC 190.

Radio signals are transmitted to the mobile transponder radio receivers from a master radio transmitter/receiver unit 189 operating at 418 MHz with FM encoding.

Figure 19:
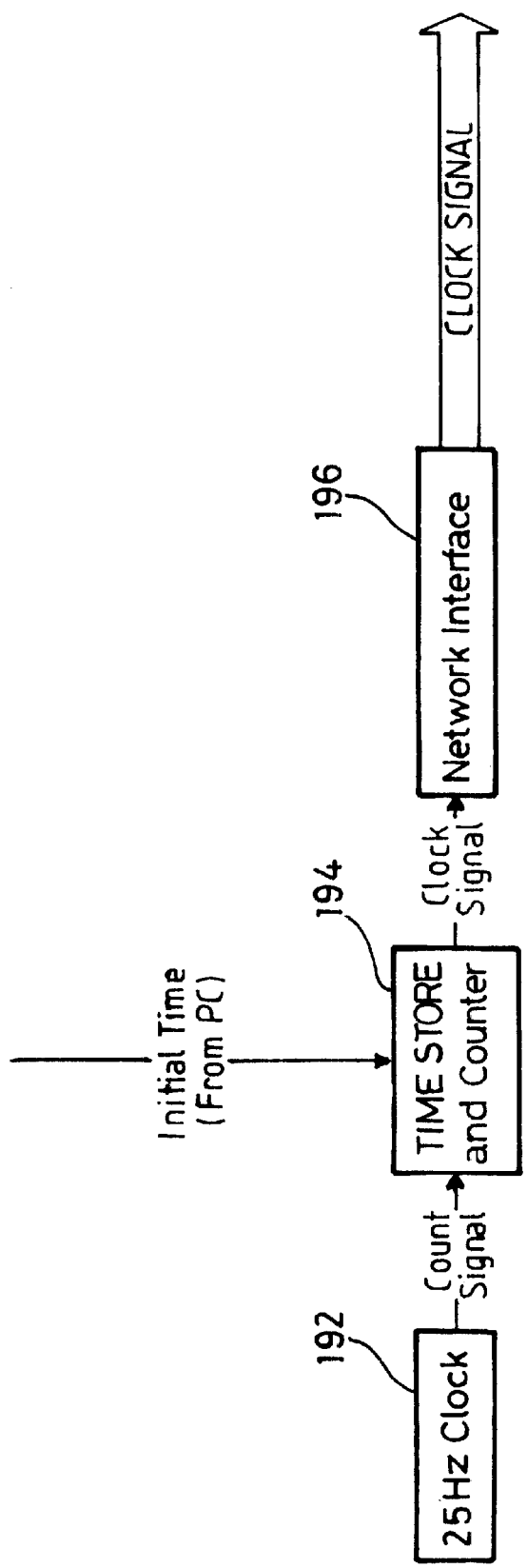
FIG. 19 is a detailed block schematic of at clock generator in FIG. 18.

Individual Part of the System (1) Clock Generator (FIG. 19)

The Clock Generator 188 sends an accurate 25 Hz clock pulse and global time value to the Zone Manager and the Matrix Managers across a serial network. The generator has a 25 Hz 192 clock which drives a time store and counter 194. The time store holds the current global time value, and the counter increments it with every pulse. An initial global time value may be loaded from a the PC 190 connected to the Clock Generator (see FIG. 18).

After incrementing the current global time value, that value, and the clock pulse are gated to a serial network interface 196, which distributes these signals to other system components, so as to synchronise them.

Figure 20:
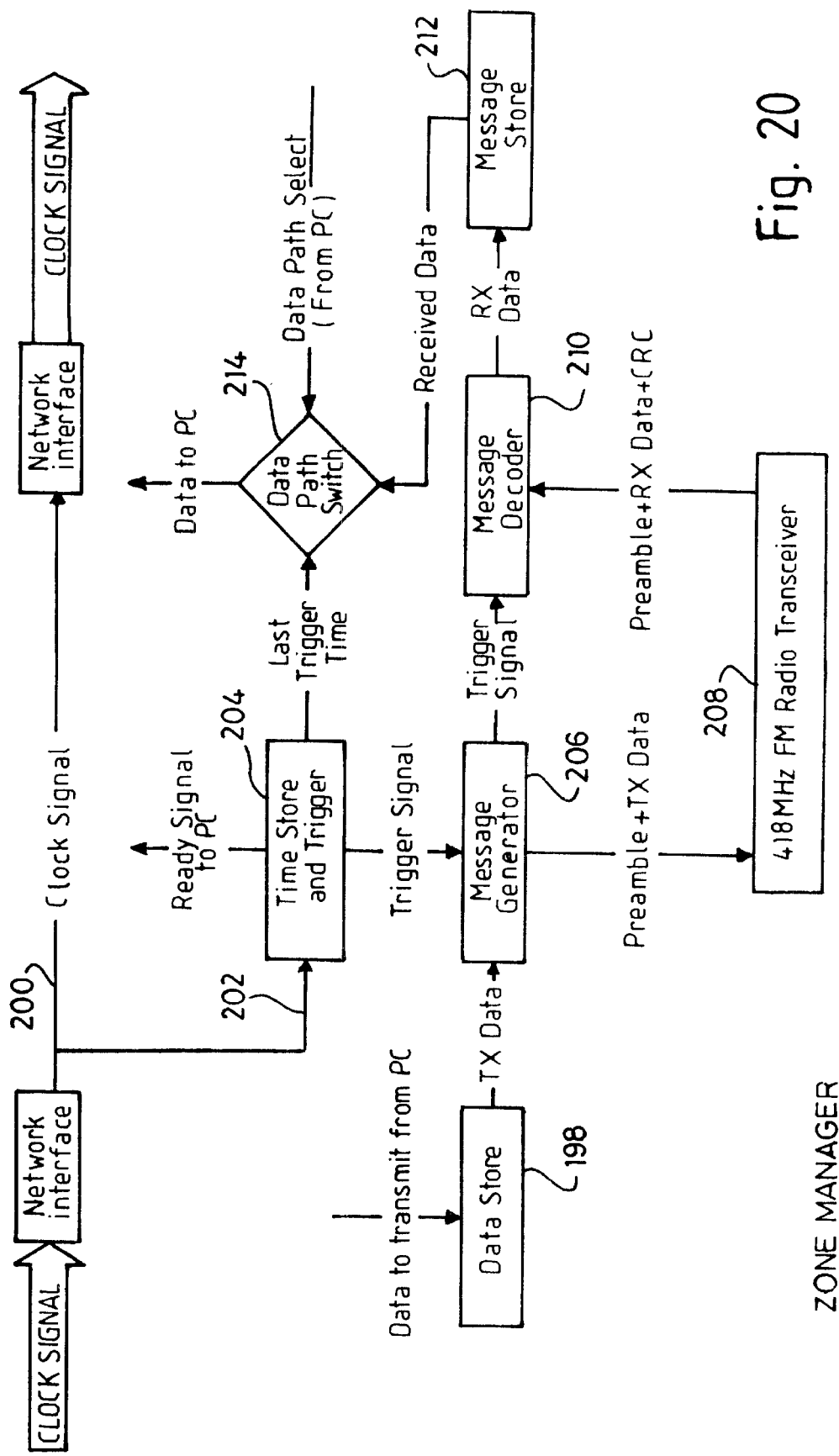
FIG. 20 is a detailed block schematic of a zone manager of FIG. 18.

(2) Zone Manager (FIG. 20)

Each Zone Manager (158, 166, 182 etc in FIG. 18) handles the radio interface between the Scheduling PC and the Mobile Transmitters. As shown in FIG. 20, it has a Data Store 198 which is filled by the Scheduling PC with the next packet to be transmitted. When this process is complete, the Zone Manager unasserts the "Ready" status line. On receipt of a clock pulse from the synchronisation network (200) along 202, the Zone Manager stores the associated time in a Time Store, 204, and triggers a Message Generator 206. The Message Generator sends a 136-bit preamble followed by a Manchester-encoded copy of the stored packet at 40 kbps to the transmit side of a 418 MHz FM Radio Transceiver 208, thus sending a DC-balanced copy of the desired message to the Mobile Transmitters.

After sending the message, the Zone Manager triggers a Message Decoder 210, which looks at the incoming signals picked up by the receive side of the Transceiver 208. Any incoming radio message sent by the radio transmitting section of the Mobile Transponder is decoded and error-checked, and if the message is valid it is stored in a Message Store 212.

When time has been allowed for the outgoing message to be sent and any incoming messages to be detected, the Zone Manager asserts the "Ready" status line indicating that the Scheduling PC can review the stored time and any stored message. To this end the scheduling PC controls Data Path Switch 214 to supply trigger tune (from 204) and/or message (from store 212) as appropriate, before loading the next packet to be transmitted. The global clock synchronisation network signals pass unchanged through the Zone Manager.

(3) Scheduling PC

The Scheduling PC 154 (FIG. 18) is programmed to determine the order in which Mobile Transmitters should be addressed based on the Location Qualities of Service (LQoS) assigned to them (either statically, or dynamically by users and applications) The Scheduling PC also constructs the packets to be sent to Mobile Transponders (via the Zone Managers), and performs resource reclamation.

The algorithm used to choose the next Mobile Transmitter to be addressed is described in the sections above entitled "Schedule Implementation".

Once the next Mobile Transmitter's address has been determined, the Scheduling PC determines whether an application requires that an "Output Data Value" should be sent to that transmitter. It also determines whether applications have indicated that the transmitter is no longer responding to addressing messages (perhaps because it has been removed from the range of all the receivers in the room or building in the case of a multi-zone system). If so, the transmit or drop bits in the next message should be set, to check the situation, or reclaim resources (as described above).

The Scheduling PC also determines whether any Mobile Transmitters should be woken prematurely from a sleeping state, in which case the wake bit should be set. It also can acknowledge that a mobile transponder has been registered with the system whether this has been done by an operator, or an application according to data/time or data forcing the system to look for a particular mobile transponder address or has been achieved automatically.

Two values, s (the score) and e (the Effective Location Quality of Service) associated with the Mobile Transponder to be addressed, and maintained by the scheduling algorithm, can be used to estimate a time for which that Mobile Transponder may go to sleep. It can be shown that, assuming the LQoS demands managed by the system do not change, the Mobile Transmitter will not be addressed in at least the next s t timeslots, given by Equation (13).

A message packet is then constructed from the collected information. The packet has a number of Cyclic Redundancy Check (CRC) error checking codes embedded within it(the standard CRC-8 code is used), and its format is given in Table (A).

If no data value is to be sent to the Mobile Transponder, the Output Data Value field is set to 255. Similarly if no Mobile Transponder registrations require acknowledgement, the Registration Acknowledgement field is set to zero.

The message packet is loaded into the Zone Manager's Data Store in 8-bit chunks. After the last chunk is loaded, the Scheduling PC start to continuously poll the Zone Manager's "Ready" status line. This line is asserted when the Zone Manager has transmitted any stored message where the radio receiver section of the transceiver 208 is being employed.

At this time, the Scheduling PC retrieves (from the Zone Manager) the time at which the transmission was made, and sends an event of the form (identifier, time) to he Area Manager across a CORBA interface (Object Management Group, The Common Object Request Broker; Architecture and Specification. Revision 1.1, OMG Document Number 91.12.1, December 1991), indicating the 16-bit identifier of the addressed Mobile Transmitter and the time of addressing.

Finally, the Scheduling PC retrieves from the Zone Manager any incoming message sent by the radio transmitter of the address Mobile Transponder (where fitted and utilised) Any such message will contain an address and button status bits. The Scheduling PC must deal with any registration request detected in this way, and/or inform any applications which are interested in "Button Pressed" events from Mobile Transponders.

It then identifies the address of the next Mobile Transmitter by repeating the scheduling process described in this section.

Figure 21:
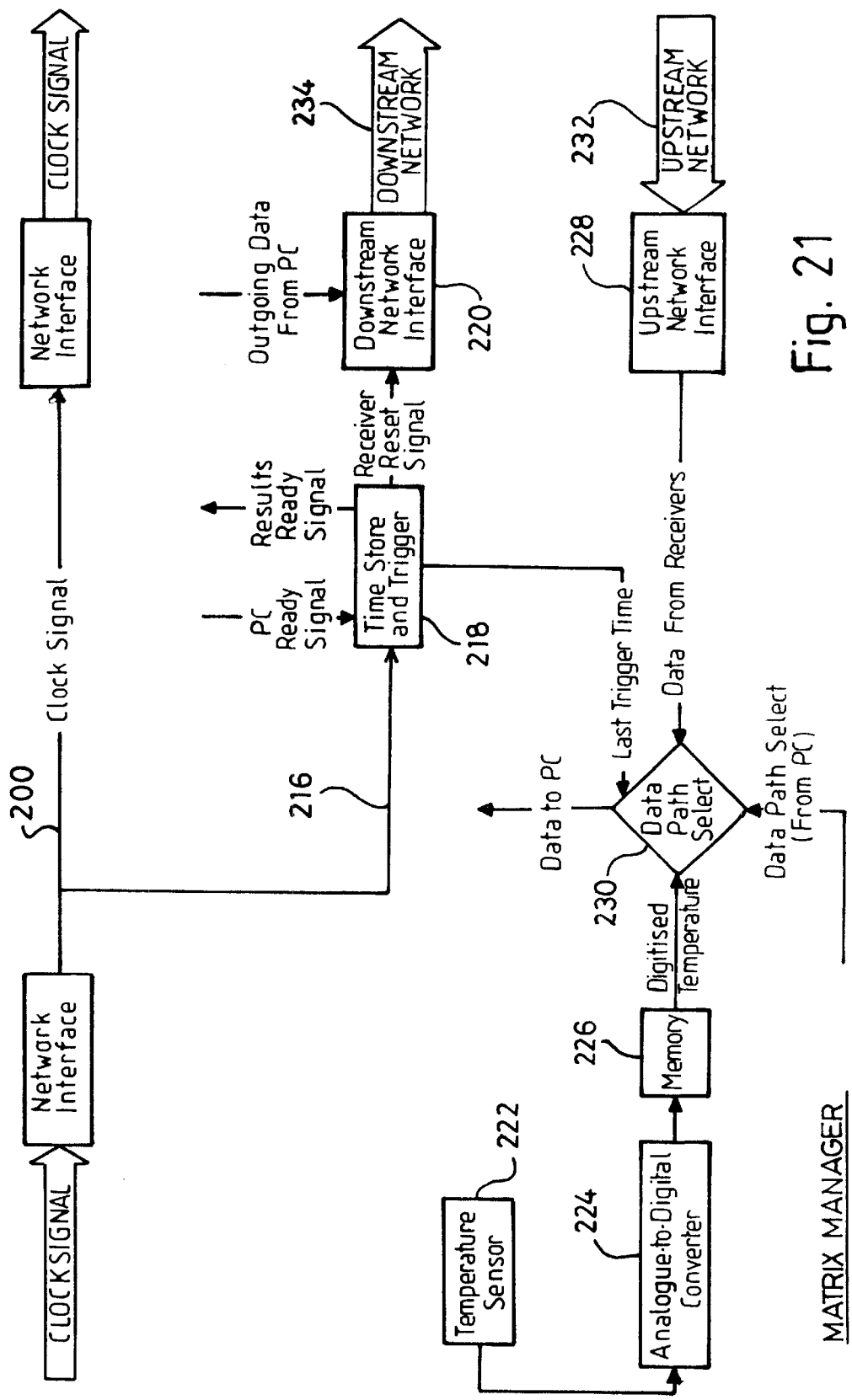
FIG. 21 is a detailed block schematic of a matrix manager of FIG. 18.

(4) Matrix Manager (FIG. 21)

The Matrix Manager shown in FIG. 21 resets ultrasound Receivers (eg 20, 22 etc in FIG. 1) connected to it, at a precise time, and acts as an interface between the Positioning PC and those Receivers.

On receipt of a clock pulse along line 216 from the synchronisation network 200, the Matrix Manager stores the associated time in a Time Store 218, limits for 9.65 ms to allow the radio message to be sent and sends a "Reset" signal over its Downstream Network Interface 220 to the ultrasound Receivers connected to it. After 20 ms, the Matrix Manager asserts the "Results Ready" status line, which indicates to the Positioning PC that the Receivers will have made their measurements, and that the Positioning PC can now use the "Outgoing Data" bus to poll those Receivers to determine the results.

The Positioning PC can also retrieve the time at which the Receivers made their measurements by recovering the time held in the Time Store 218. It can also retrieve the latest measurement of the temperature in the room measured by a temperature sensor 222, the output of which is continually digitised by ADC 224 and stored in memory 226 for retrieval for example when the Receivers are reset.

The Positioning PC can also send commands to the ultrasound Receivers through the "Outgoing Data" bus to change the peak detection algorithm or thresholds used by the ultrasound Receivers.

When the Positioning PC asserts the "PC Ready" status line to indicate that it has performed all necessary actions associated with the current measurements, the Matrix Manager unasserts the "Result Ready" status line and prepares itself for the next clock pulse.

Data from the radio link (if utilised) between transceiver 208 and the mobile transponders is received via the upstream Network Interface 228 and transferred when instructed to a Data Path Selector switch 230 (FIG. 20) together with the digital temperature value from 226.

The global clock synchronization network signals pass unchanged through each Matrix Manager in turn.

Figure 22:
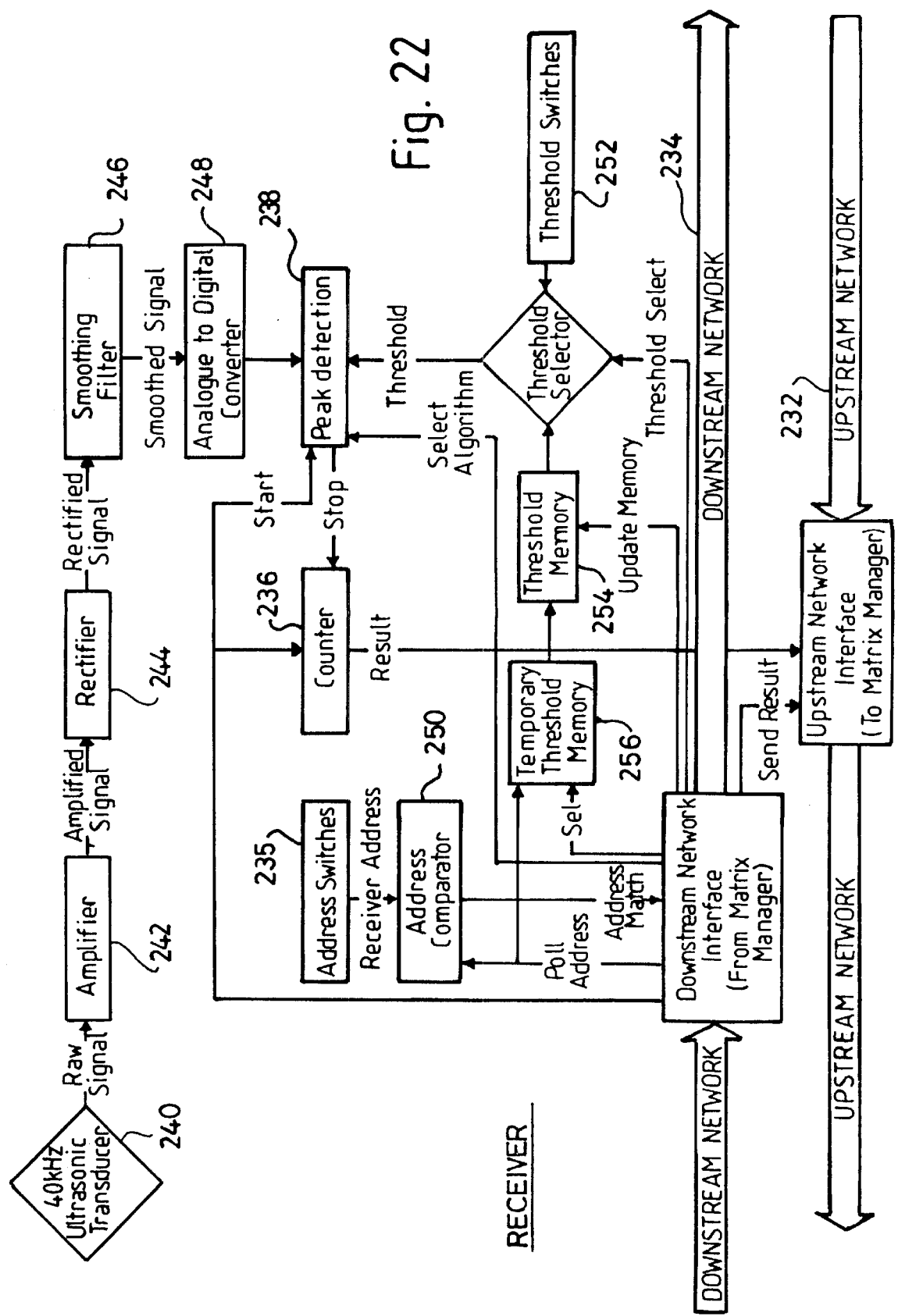
FIG. 22 is a detailed block schematic of an ultrasound receiver such as is incorporated in each room of the system of FIG. 18.

(5) Receiver (FIG. 22)

The receiver shown in FIG. 22 detects ultrasonic signals from the transducer on the Mobile Transponders, and converts them to electric signals and processes those signals to determine the time at which the received acoustic signal peaked for the first time. Receivers are connected in a serial daisy-chain to a Matrix Manager by two networks—and upstream network, 232 which carries information to the Matrix Manager, and a downstream network 234 which carries information from the Matrix Manager. Each Receiver has an address which is unique amongst those connected to the same Matrix Manager, allowing it to be polled by the Positioning PC also connected to that Matrix Manager. The address may be coded for example by setting switches 235 on the PCBs of the Receivers.

When a Receiver detects a "Reset" signal condition on the downstream network 234, it resets at on-board counter 236 and peak detection circuit 238. For the next 20 ms, the counter is updated at a frequency of 20 kHz, and the peak detection circuit monitors a signal from a 40 kHz ultrasonic transducer which has been amplified in 242, rectified in 244, smoothed in 246 and digitized in 248.

When the peak detection circuit indicates stat the signal has peaked for the first time, counter 236 is stopped.

If the 20 ms window closes before a peak is defected, the value 0 is formed in the counter.

After the 20 ms period, the Receiver may be polled by the Positioning PC via the Matrix Manager and the downstream network 234. If an address comparator 250 in the Receiver links to the switch coded address 235 detects that the Receiver is being polled, the stored value in the counter is sent back to the Positioning PC via the upstream network 232 and Matrix Manager, together with error-checking information. Incoming information from other Receivers on the upstream network is blocked during this period.

Additional lines on the downstream network 234 can be used by the Positioning PC to change the peak detection algorithm used by the Receiver. Two algorithms may be used:

Stop the counter when the signal has risen above a certain absolute threshold and when the signal peaks for the first time. This is the default algorithm.

Stop the counter when the signal has rise above a certain threshold relative to the lowest signal value seen so far. this algorithm is more useful when the offset of the Receiver amplifier is liable to change.

The threshold source may he a bank of switches 252 on the Receiver PCB, or a Threshold Memory 254. The threshold source may, again, be changed by the Positioning PC by using lines on the downstream network. To set the value in the Threshold Memory 254, the Positioning PC sets the poll address on the downstream network to the new value, and then asserts further lines such that each of the Receivers load the poll address value into a Temporary Threshold Memory 256. The Positioning PC then sets the poll address on the downstream network to the address of the Receiver whose threshold must be altered, and asserts further downstream network lines to transfer the value from the Temporary Threshold Memory 252 into the Threshold Memory 254 of the appropriate Receiver.

(6) Mobile Transponder (FIG. 23)

The Mobile Transponder shown in FIG. 23 can be attached to objects, and generates ultrasonic signals 258 by which its position and possibly orientation can be determined.

Incoming radio messages from a Zone Manager are picked up by a 418 MHz FM Radio Transceiver 260 and decoded by a Message Decoder 262. The Message Decoder also uses error-checking information in the incoming messages to determine if bit errors on the radio link have occurred.

After the message has been received, the Power-Saving Supervisory Circuit 264 switches off the receive side of the Radio Transceiver 160.

A Message Generator 266 allows the Mobile Transponder to contact the Zone Manager through the transmit side of the Radio Transceiver 260. The Message Generator is used by a Registration Controller 268, which handles attempts to make the Zone Manager aware of the presence of the Mobile Transponder, and is also activated when a user presses one of two buttons 270, 272 on the Transponder (if fitted).

If a good message is received, the Message Decoder compares the transmitter address contained in the incoming message with that stored in ROM 274. If the addresses match, then:

1. A trigger signal is sent to a Pulse Signal Generator 276, which drives a set of ultrasonic transducers 278 (arranged around a hemispherical shell) at 40 kHz for 50 μs to produce the ultrasound pulse 258.
2. A counter in the Power-Saving Supervisory Circuit is loaded with the value of the sleep time in the message (via line 280).
3. If the drop bit in the message is set, a Registration Controller 282 on the mobile device is informed that the Zone Manager will no longer address this Mobile transmitter. The Registration Controller will then begin attempts to register with the Zone Manager. If the drop bit is not set, but the Mobile Transmitter is attempting to register with the Zone Manager, the Registration Controller 282 is informed that the registration attempts were successful, and it need not attempt to register again.
4. If the transmit bit in the message is set, the Mobile Transponder prepares to immediately transmit its address over its bi-directional radio interface (260) to 208.
5. The 8-bit Output Data Value in the message is sent to a 10-way data port on the Mobile Transponder (the port also includes a ground line, and a strobe line which indicates when the data is valid).

If the Message Doctor indicates that the incoming message is not for the current transmitter, but that the Registration acknowledgement field contains the address of the current transmitter, then the Registration Controller 282 is informed that the Zone Manager is now aware of this Mobile Transponder, and that no more registration attempts are needed.

After the incoming message has been decoded, the Mobile Transponder may attempt to send a data packet back to the Zone Manager through the transmit side of the 418 MHz radio transceiver 260. This behaviour may be caused by a number of events:

1. The transmit bit in the incoming message was set, and the transmitter address encoded in the incoming message is the same as that of the Mobile Transponder.

2. A button switch on the Mobile Transponder has been pressed.
3. The Registration Controller 282 is attempting to register the Mobile Transponder with the Zone Manager, and the transmit bit of the incoming message is not set, and he probabilistic "Slotted ALOHA" contention-resolution protocol (driven by a pseudo-random number generator) indicates that the Mobile Transponder should attempt to send data to the Zone Manager in this timeslot.

If one of these events does occur, a message generator waits a 25 μs turnaround time before switching on the transmit side of the Radio Transceiver 260, and sending (at 40 bps) a 168-bit preamble followed by a Manchester-encoded version of the packet whose format is shown in Table (B).

A Cyclic Redundancy Check code may be included in the packet to detect link errors or collisions with transmissions from other Mobile Transmitters. A standard CRC-8 algorithm is used to generate the CRC.

After transmission of the preamble and packet, the Message Generator switches off the transmit side of the Radio Transceiver 260.

The Power-Saving Supervisory Circuit 264 is used to control other parts of the Mobile Transmitter in order to save power. It is driven by a 32 kHz clock 284, which allows it to be low-powered itself. The prime function of this circuit is to turn on the receive side of the Radio Transceiver 260 every 40 ms, so that the next incoming radio message from the Zone Manager may be detected and decoded. However, if the Sleep Counter is not zero (indicating that the Mobile Transponder may enter an even lower-powered sleeping state), the Power-Saving Supervisory Circuit 264 decrements this counter once every 40 ms, and only activates the receive circuitry of the Mobile Transmitter 260 once every eight timeslots (so that the wake bit periodically may be checked). The Power-Saving Supervisory Circuit 264 also controls an 8 MHz clock 265 which is used by the Message Decoder 262 and Message Generator 266.

If the Message Decoder 262 indicates that the wake bit in the incoming message was set, then the Power-Saving Supervisory Circuit 264 sets sleep counter 286 to zero. This action ensures that the transmitter will check each incoming message until it is instructed that it no longer needs to do so.

If the Message Decoder 266 indicates that an error occurred on the radio link, or that no message was received when one was expected, the Mobile Transponder will enter a "Searching" mode. In this mode, the low-power supervisory circuit switches on the receive side of the 418 MHz Radio Transceiver 200 approximately once every 80 s, for a period of just over one second, and the Registration Controller 282 is informed that it should attempt to register with the Zone Manager. The "Searching" mode is also the default state of the Mobile Transponder when it is switched on for the first time.

(7) Positioning PC

A 200 MHz Pentium-pro IBM compatible PC with a 48 line parallel digital IO card may be used and the same hardware is suitable for all PCs shown.

Associated with each Matrix Manager is a Positioning PC 154, 168, 184 which computes the compositions of Mobile Transmitters from the time-of-flight values determined by Receivers 160, 1672 etc (whose surveyed positions are stored in memory by the Positioning PC). It continuously polls the Matrix Manager to determine whether the Receivers have been triggered and have results which should be processed. When the "Results Ready" status line is asserted by the Matrix Manager, the Positioning PC (via the Matrix Manager) polls each of the n Receivers connected to the Matrix Manager, retrieves a data value from each (along with error checking information), and unasserts the "PC Ready" status line.

For each Receiver that returns a good non-zero data value (ie. the error checking information indicates a good data value, which, being non-zero, indicates a signal was detected by that Receiver), that data value is used to calculate a transmitter-receiver distance. The Positioning PC interrogates the Matrix Manager such as 166, 182 and determines the current temperature of the room, t (measured in °C). It is then possible to calculate the speed of sound in the room.

Calibration of the system during installation provides a value, d, for the fixed delays in the system (such as the time taken to decode the radio message by the Mobile Transponder). From the pulse time-of-flight, fi, from the Mobile Transponder to Receiver i, the corresponding transponder-receiver distance can then be calculated, li as $li=cx(f_i-d)$.

If a Mobile Transponder is at the coordinates (u, v, w) and the distance from it to a Receiver at the coordinate (x, y, 0) is l, are that all Receivers lie in the plane of the ceiling.

Equation 1 can be regarded as a nonlinear model, see Myers, R. Classical and Modern Regression with Applications, PWS-KENT, 1990, and can use nonlinear regression to it the values of l,x and y for several Receivers to this model. This gives estimates $\hat{u}$, v and $\hat{w}^2$. This allows the determination of a best least-squares estimate for the Mobile Transponder's position as the coordinate ($\hat{u}$, $\hat{v}$, $-\sqrt{\hat{w}^2}$), taking the negative square-root of $\hat{w}^2$ to fix the transponder below the ceiling. A shadow solution (($\hat{u}$, $\hat{v}$, $-\sqrt{\hat{w}}$) corresponds to an impossible transmitter position above the ceiling. The non-linear model has three degrees of freedom, and knowledge of at least three transponder-receiver distances is therefore required to calculate the Mobile Transponder's position. Furthermore, the model cannot be fitted to the data if all Receivers that detected a signal are collinear.

Reflected signals from objects in the environment can lead to incorrect distance measurements. Normally, the first signal peak detected by a Receiver well be due to a pulse travelling along a direct line from the transponder This pulse will arrive before any reflected pulses, which must travel along longer paths. The distance thus measured by the system will be that of a straight line joining transponder and receiver. Occasionally, however, the direct path may be blocked, and the first received signal peak will be due to a reflected pulse. In this case, the measured transponder-receiver distance will be greater than the true distance, leading to an inaccurate estimate of the transponder's position.

Two techniques have been developed for identifying and eliminating inaccurate distance measurements. First the difference of two transponder-receiver distances cannot be greater than the distance between the Receivers. If, by comparing pairs of measurements, two Receivers are found whose results do not satisfy this test, it can be seated that the larger of the two distances must be a measurement along a reflected path (remembering that reflections can only increase the measured distance), and can discard that result from the data set.

Secondly, a statistical test has been developed based upon the observation that the proportion of Receivers that detect only reflected signals is small. Studentized residuals (Glantz, S., Slinker, B. Primer of Applied Regression and Analysis of Variance. McGraw-Hill, 1990) provide one method of identifying outliers in data sets, and can be calculated for each of the distance measurements during the nonlinear regression process. An incorrect measurement will be considered to be an outlier in the full set of measurements, and it is likely to have a large studentized residual. The result with the largest positive studentized residual is removed from the set of distance measurements (remembering, again, that reflections can only increase the measured distance), before re-computing the nonlinear regression and residuals.

The statistical test is repeated until the variance of the remaining measurements fall below an acceptable threshold (suggesting that all outlying data points have been eliminated), or only three measurements remain. A final calculation of the transmitter's position is then made using those data values.

From the calculated position and the known locations of the Receivers that detected a signal from the Mobile Transmitter, it is also possible to estimate θ, the orientation of the Mobile Transmitter around a vertical axis. the method used to perform this estimation has been described above.

The Positioning PC then retrieves (from the Matrix Manager) the time at which the measurements used in the position calculation were made. Finally, it sends an event of the form (x, y, z, θ, time) to the Area Manager across a CORBA interface, indicating the calculated position (x, y, z) , orientation (θ) and time of measurement, and informs the Matrix Manager that it is ready for the next set of readings (by asserting the "PC ready" status line).

It should be noted that the Positioning PC (168, 184) can send commands to individual Receivers (via the Matrix Manager) to change the peak detection algorithm they use, or to change the threshold they store in memory, or to change the source of the threshold that the peak detection algorithm uses (either on-board switches, or memory)

(8) Area Manager (FIG. 18)

As shown in FIG. 18 data from the Scheduling and Positioning PC's is transmitted to the Area Manager 186 which comprises inter alia a data processor (such as a PC). This gathers events of the form (identifier, time) from the Zone Manager, and events of the form (x, y, z, θ,time) from each Matrix Manager.

An associative memory in the Area Manager links events using the time parameter, and generates a stream of events of the form (identifier, x, y, z ,e, time).

It can be seen that these events contain identification, location, orientation and time information, and therefore allow the position and orientation (at a particular time) of a transponder to be determined.

This event stream (shown at 288 in FIG. 1) may be passed on to users and client applications.

Power Saving at the Receiver-transmitter Units

Power saving can be achieved in the transponders by switching the receiver into a quiescent or OFF mode during the time intervals between addressing, and if the frequency at which a particular transponder unit is to be addressed is known this can be encoded into the radio message so that after decoding the message the receiver section can be turned off for that period of time.

Control Signals Using Radio Transmitters

Additional information in the form of control signals may be encoded into the radio addressing signals transmitted to the transponder units so as for example to control a display or robotic device, associated with the transponder unit.

Share Determination

Electrical signals indicative of the positions of a plurality of transmitters located at selected, strategic points on an object, may be derived and stored and processed, for example by comparison with stored electrical signal data or processed by means of an algorithm, to produce a decision signal indicative of the shape of the object. This may enable a new object to be identified by reference to its shape.

Display of Monitored Area

Electrical signals indicative of the position and/or orientation of an object whose position and orientation (relative to the area) have been determined by position determining systems, may be employed to control the display of a graphical representation of the object on a TV or computer monitor, together with graphical representations of other objects also identified by position (and orientation if measured).

What is claimed is:

1. A system which enables the position of each of a plurality of labelled objects in a specified environment to be determined by determining the transit time of slowly propagating energy transmitted from a transmitter of slowly propagating energy on each labelled object to a plurality of receivers positioned at fixed points in or around the specified environment, and computing therefrom the actual distance of the transmitter from the receivers, wherein the transmission of the slowly propagating energy is initiated by a burst of high speed propagating energy from a master transmitter of high speed propagating energy located so as to cause transmitted bursts of such high speed energy to enter said environment, the transmitter of high speed propagating energy on each object being controlled by an object mounted receiver adapted to respond to an appropriately encoded burst of such high speed energy, each said burst being encoded so as only to be responded to by one of the object mounted receivers (each transmitter/receiver combination being referred to as a transponder), to thereby initiate a burst of slowly propagating energy from the transponder, wherein the burst originating transponder location is identifiable from the encoding of the transmission which triggers that transponder and the burst is of just sufficient duration to provide a response at the receivers and in order to allow the system to adapt to different numbers of transponders and different demands for service, and a coordinating control system is provided for determining the order in which the object mounted transmitters are to be triggered by the encoded transmissions from the master transmitter, in response to updatable information relating to the service demands of the transmitter and/or transponders and/or objects.

2. A system as claimed in claim 1, wherein the encoding of the high speed energy transmission enables a plurality of different slow speed signal transmitters all located in the same specified environment to be triggered in turn, so that during a sequence of time windows, position data relating to each of the slow speed signal transponder transmitters in the environment can be obtained, the data in each window relating specifically to only one of the object mounted transducer transmitters.

3. A detection system for determining information concerning at least the position of an object, using signal pulses respectively of high and slow propagation speeds for use in a system as claimed in claim 1, comprising at least three fixed, non-colinear, distributed slow speed signal responsive receivers, at least one transmitter unit for transmitting slow speed signal pulses, mounted on the object, means for generating and transmitting high speed signal pulses to synchronise slow speed signal pulse transmission from the transmitter with the commencement of a reception sensitive period at a receiver, and means for computing signal pulse reception times and correlating differences therein to determine the required information about the position of the object.

4. A detection system as claimed in claim 3, further comprising a coordinating device to address the object mounted transmitters, as by sending address information to them as part of a regular time synchronisation signal.

5. A system as claimed in claim 1 wherein a bi-directional link is provided between the coordinating control system and each transponder receiver by adding a second transmitter to each transponder receiver and adding a compatible receiver to the coordinating control system, such transponders being referred to as bi-directional transponders, whereby the latter are enable to transmit data to the coordinating control system.

6. A system as claimed in claim 1, wherein each transponder further includes input and output facilities.

7. A system for determining the position of an object in a specified environment, in which the transit time is determined of slowly propagating measurement energy transmitted from a transmitter on the object to a plurality of receivers positioned at fixed points in or around the specified environment, and in which the distance of the transmitter from each receiver is computed from the times taken for the measurement transmission to propagate from the object to some of the receivers, and wherein the slowly propagating measurement energy is initiated by a trigger burst of energy having a higher speed of propagation from a master transmitter of high speed propagating energy which is located so as to transmit trigger bursts into the environment to initiate the measurement energy transmitter on the object of interest, and wherein a plurality of such transmitters are located on different objects and/or points of the same object, within the environment, and each transmitter of measurement energy is associated with and controlled by signals from a receiver responsive to trigger burst transmissions, and the latter are encoded and/or transmitted at different frequencies so that the receivers located throughout the environment can be individually addressed from the master transmitter, each said combination of a receiver and transmitter being referred to as a transponder, characterised in that a coordinating control system is provided for determining the order in which the object mounted transponder transmitters are to be addressed and triggered by the transmissions from the master transmitter, together with memory means for storing relevant information about the different transponder transmitters by reference to their unique address, by which the order can be determined.

8. A system as claimed in claim 7, wherein the coordinating control system memory means stores a unique address for each of the transponder transmitters and the control system is programmed to encode the transmissions using the address information so as only to address the transponder transmitters individually.

9. A system as claimed in claim 8, in which in addition to the unique address for each transponder transmitter at least one additional item of information (Weighted Hierarchy Information for Schedule Positioning—or "WHISP" is stored in a manner which can be associated with each unique address and the control system is programmed to select from the addresses that of the receiver and transmitter next to be poled using the WHISP values to determine the order of addressing.

10. A system as claimed in claim 9, wherein a WHISP is stored for each unique address and the WHISP is changed to adjust the subsequent addressing of the transponder transmitters.

11. A system as claimed in claim 9, wherein each WHISP comprises two items of information, firstly the length of time since the transponder transmitter was last addressed (which may be continually updated by the clock information) and secondly a rate of interrogation figure to be achieved by the system for that transponder transmitter.

12. A system as claimed in claim 11, wherein the system is programmed to utilise a third item of data within a WHISP and logic circuit means is provided to increase the frequency of tracking of an address of a first object if a second object having such a third item of information stored as part of its WHISP is perceived by the position determination of the second object, to have moved close to the first object.

13. A system as claimed in claim 9, wherein changes to WHISP data occur as a result of a lapse of time, the arrival of a particular time or date, by interaction with an application running on a computer which may be part of the position determining system or the coordinating control system or another computer altogether, or by the entry of data by an operator.

14. A location system which includes a set of ultrasound receivers placed at known positions on a ceiling in a room to detect ultrasonic signals from an ultrasound transmitter attached to an object in the room, and by determining the times of flight of those signals from the ultrasonic transmitter to the ultrasound receivers so calculates the position of that object in the room, wherein the system is extended by a programmable coordinating control system to address more than one ultrasonic transmitter in the room provided each has a unique address so that they can be triggered separately, by serially polling the transmitters in response to control signals from the control system.

15. A method of determining the position and orientation in a specified environment of an object to which a plurality of transponder transmitters are attached at known spaced apart positions comprising the steps of finding the position of each of said plurality of transmitters within the environment and comparing the positions of those transmitters with the coordinates of at least one, and preferably a number of, different known points in said environment, thereby to determine the relative position of the transmitters to the known points, and relating the positions of the transmitters to the object on which they are mounted, to determine its position and orientation of the object relative to the environment.

16. A method as claimed in claim 15, wherein the step of finding the position of each of the plurality of transponder transmitters includes transmitting appropriately encoded trigger signals for reception by a single transponder receiver, said transponder receiver having decoding logic for driving the plurality of transponder transmitters attached to the known spaced apart positions on the object.

17. A method as claimed in claim 16, wherein the step of finding the position of each of the plurality of transponder transmitters includes transmitting a selected one of a plurality of address signals for reception by the transponder receiver, each of the plurality of transponder transmitters being uniquely triggerable by a corresponding one of the plurality of address signals.

18. A system for determining the orientation of an object within an environment defined at least in part by means of a plurality of detectors sensitive to measurement energy and located at a corresponding plurality of known positions therein, wherein transmitter means is mounted on the object which is adapted to transmit measurement energy away therefrom and towards the detectors and has a known position relative to the object, and wherein polling means is provided for interrogating the detectors to determine on which if any the transmitted energy has been incident and for computing the straight line distances from the object to the detectors and thereby determining the position of the object in said environment characterised in that by using the known relationship between the transmitter means and the object, the direction in which the object is facing in terms of the said environment, can also be determined.

19. Method of determining the orientation of an object having a transmitting device mounted at a known position thereon, when located in an environment containing a plurality of detectors sensitive to energy transmitted by said transmitting device and located at known positions in the environment, wherein the object is opaque to the transmitted energy, so that a directional transmission is obtained and wherein the energy is transmitted at a defined point in time and the detectors are interrogated at a later point in time to identify those on which energy has been incident prior to the later point in time, to enable the computation from the transit times to the identified detectors of the straight line distances between the transmitting device and the detectors, further comprising the step of determining the orientation of the opaque object by reference to the pattern of the identified detectors and by reference to the position of the transmitting device relative to the object.

* * * * *